(12) United States Patent
Kwon et al.

(10) Patent No.: US 9,843,081 B2
(45) Date of Patent: Dec. 12, 2017

(54) LITHIUM AIR BATTERY AND METHOD OF MANUFACTURING THE SAME

(71) Applicant: Samsung Electronics Co., Ltd., Suwon-si, Gyeonggi-do (KR)

(72) Inventors: Soonchul Kwon, Hwaseong-si (KR); Joonseon Jeong, Seoul (KR); Yooseong Yang, Yongin-si (KR); Dongmin Im, Seoul (KR); Wonsung Choi, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 2 days.

(21) Appl. No.: 15/158,708

(22) Filed: May 19, 2016

(65) Prior Publication Data
US 2016/0344081 A1 Nov. 24, 2016

(30) Foreign Application Priority Data
May 21, 2015 (KR) .......................... 10-2015-0071141

(51) Int. Cl.
*H01M 10/052* (2010.01)
*H01M 10/0525* (2010.01)
(Continued)

(52) U.S. Cl.
CPC ........... *H01M 12/08* (2013.01); *H01M 2/145* (2013.01); *H01M 2/1653* (2013.01); *H01M 4/382* (2013.01); *H01M 6/181* (2013.01); *H01M 8/1018* (2013.01); *H01M 8/1044* (2013.01); *H01M 10/052* (2013.01); *H01M 10/0565* (2013.01); *H01M 12/06* (2013.01); *H01M 2/166* (2013.01); *H01M 4/8615* (2013.01);
(Continued)

(58) Field of Classification Search
CPC ........................ H01M 10/052; H01M 10/0525
See application file for complete search history.

(56) References Cited

U.S. PATENT DOCUMENTS

| | | | |
|---|---|---|---|
| 6,706,449 | B2 | 3/2004 | Mikhaylik et al. |
| 8,389,587 | B2 | 3/2013 | Pan et al. |

(Continued)

FOREIGN PATENT DOCUMENTS

| | | |
|---|---|---|
| EP | 3093906 A1 | 11/2016 |
| JP | 2012-234673 A | 4/2011 |

(Continued)

OTHER PUBLICATIONS

Noor et al.,"Poly(vinyl alcohol)-LiBOB complexes from lithium-air cells", Electrochimica Acta, vol. 102, 2013, pp. 149-160.
(Continued)

*Primary Examiner* — Olatunji Godo
(74) *Attorney, Agent, or Firm* — Cantor Colburn LLP

(57) ABSTRACT

A lithium air battery includes: a lithium negative electrode; a positive electrode; and an ion conductive oxygen-blocking film which is disposed on the lithium negative electrode, wherein the ion conductive oxygen-blocking film includes a first polymer including a polyvinyl alcohol or a polyvinyl alcohol blend, and a lithium salt, and wherein the ion conductive oxygen-blocking film has an oxygen transmission rate of about 10 milliliters per square meter per day to about 10,000 milliliters per square meter per day. Also a method of manufacturing a lithium air battery is disclosed.

32 Claims, 12 Drawing Sheets

(51) Int. Cl.
| | |
|---|---|
| *H01M 12/08* | (2006.01) |
| *H01M 2/14* | (2006.01) |
| *H01M 2/16* | (2006.01) |
| *H01M 10/0565* | (2010.01) |
| *H01M 6/18* | (2006.01) |
| *H01M 12/06* | (2006.01) |
| *H01M 4/38* | (2006.01) |
| *H01M 8/1018* | (2016.01) |
| *H01M 8/1044* | (2016.01) |
| *H01M 4/86* | (2006.01) |
| *H01M 10/0569* | (2010.01) |
| *H01M 4/96* | (2006.01) |
| *H01M 6/24* | (2006.01) |

(52) U.S. Cl.
CPC ........ *H01M 4/8652* (2013.01); *H01M 4/8668* (2013.01); *H01M 4/96* (2013.01); *H01M 6/24* (2013.01); *H01M 10/0569* (2013.01); *H01M 2004/8689* (2013.01); *H01M 2008/1095* (2013.01); *H01M 2300/0045* (2013.01); *H01M 2300/0082* (2013.01); *Y02E 60/128* (2013.01)

(56) References Cited

U.S. PATENT DOCUMENTS

| | | |
|---|---|---|
| 8,546,025 B2 | 10/2013 | Tanaka et al. |
| 2004/0072066 A1 | 4/2004 | Cho et al. |
| 2010/0062342 A1 | 3/2010 | Li |
| 2014/0220439 A1 | 8/2014 | Badding et al. |
| 2014/0272595 A1 | 9/2014 | Cristadoro et al. |
| 2015/0079485 A1 | 3/2015 | Choi et al. |
| 2016/0064785 A1 | 3/2016 | Kim et al. |

FOREIGN PATENT DOCUMENTS

| | | |
|---|---|---|
| KR | 1020140112597 A | 9/2014 |
| KR | 1020150031377 A | 3/2016 |
| WO | 02/50933 A2 | 6/2002 |

OTHER PUBLICATIONS

Abraham et al., "Electrochemical Science and Technology", Journal of the Electrochemical Society, 142, No. 3, 1995, pp. 683-687.

European Search Report for European Patent Application No. 16169968.1 dated Aug. 4, 2016.

Noor et al., "Poly(vinyl alcohol)-LiBOB complexes for lithium-air cells", Electrochimica Actra, 102, 2013, pp. 149-160.

Rajendran et al., "Effect of salt concentration in poly(vinyl alcohol)-based solid polymer electrolytes", Journal of Power Sources, 124, 2003, pp. 225-230.

Subramania et al., "New polymer electrolyte based on (PVA-PAN) blend for Li-ion battery applications", Ionics, 12, 2006, pp. 175-178.

Zhang et al., "A reversible long-life lithium-air battery in ambient air", Nature Communications, 2013, pp. 1-7.

Astm International: "Designation: D 3985-02 Standard Test Method for Oxygen Gas Transmission Rate Through Plastic Film and Sheeting Using a Coulometric Sensor", Jul. 1, 2002, Retrieved from the Internet; URL:http://file.yizimg.com/175706/2011120811222922.pdf[retrieved on Jun. 21, 2017].

Every H et al., 'Lithium ion mobility in poly(vinyl alcohol)based polymer electrolytes as determined by 7Li NMR spectroscopy', Electrochimica Acta, Elsevier Science Publishers, Barking, GB, vol. 43, No. 10-11, Apr. 30, 1998, pp. 1465-1469.

European Search Report for European Patent Application No. 16 169 968.1 dated Jul. 3, 2017.

US 9,843,081 B2

LITHIUM AIR BATTERY AND METHOD OF MANUFACTURING THE SAME

CROSS-REFERENCE TO RELATED APPLICATION

This application claims the benefit of and priority to Korean Patent Application No. 10-2015-0071141, filed on May 21, 2015, in the Korean Intellectual Property Office, and all the benefits accruing therefrom under 35 U.S.C. §119, the content of which is incorporated herein in its entirety by reference.

BACKGROUND

1. Field

The present disclosure relates to lithium air batteries and methods of manufacturing the same.

2. Description of the Related Art

Lithium air batteries include a negative electrode, a positive electrode for oxidizing/reducing oxygen in the air, and an electrolyte interposed between the positive electrode and the negative electrode. Such lithium air batteries have received a great deal of attention as next generation batteries by using air in the atmosphere as a positive electrode active material, thereby maintaining a very high energy density.

In the discharging process of lithium air batteries, metal ions emitted from the negative electrode react with air (oxygen) of the positive electrode side to produce metal oxides. Further, in the charging process of lithium air batteries, the produced metal oxides are reduced into metal ions and air.

SUMMARY

Provided are lithium air batteries having an ion conductive oxygen-blocking film on the top of a lithium negative electrode.

Provided are methods of manufacturing the lithium air batteries.

Additional aspects will be set forth in part in the description which follows and, in part, will be apparent from the description, or may be learned by practice of the presented exemplary embodiments.

According to an aspect of an exemplary embodiment, a lithium air battery includes: a lithium negative electrode; a positive electrode; and an ion conductive oxygen-blocking film which is disposed on the lithium negative electrode, wherein the ion conductive oxygen-blocking film includes a first polymer including a polyvinyl alcohol or a polyvinyl alcohol blend, and a lithium salt, and wherein the ion conductive oxygen-blocking film has an oxygen transmission rate of about 10 milliliters per square meter per day to about 10,000 milliliters per square meter per day.

According to an aspect of another exemplary embodiment, a method of manufacturing a lithium air battery includes: disposing a composition for forming an ion conductive oxygen-blocking film on a substrate to form a coating, wherein the composition includes a first polymer including a polyvinyl alcohol or a polyvinyl alcohol blend, a lithium salt, and an organic solvent; drying the coating to form an ion conductive oxygen-blocking film, wherein the ion conductive oxygen-blocking film includes a first polymer including a polyvinyl alcohol or a polyvinyl alcohol blend, and a lithium salt, and which has an oxygen transmission rate of about 10 milliliters per square meter per day to about 10,000 milliliters per square meter per day; and disposing the ion conductive oxygen-blocking film between a lithium negative electrode and a positive electrode to manufacture the lithium air battery.

A lithium air battery according to an exemplary embodiment has improved cyclability and includes an ion conductive oxygen-blocking film with improved ion conductivity disposed on the top of a lithium negative electrode.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
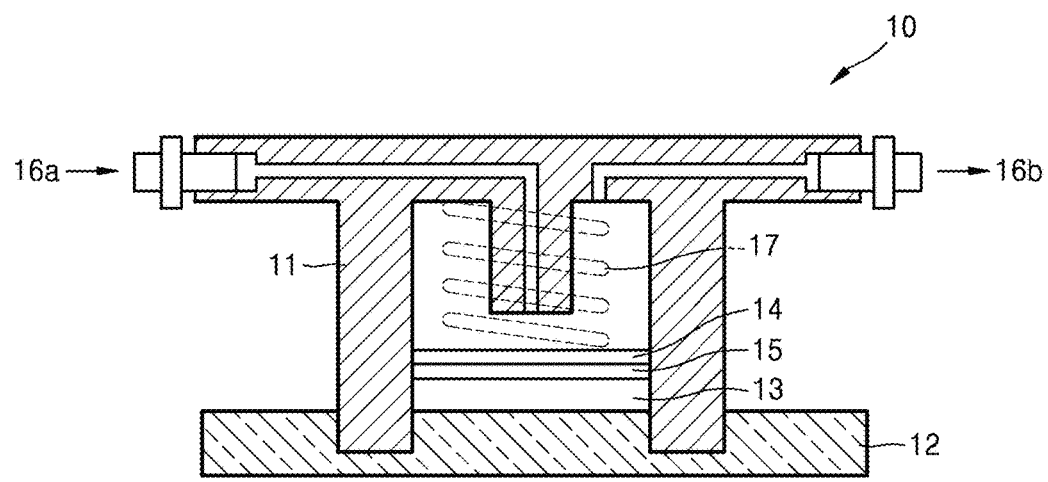
FIG. 1 is a schematic drawing of a lithium air battery according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. "Or" means "and/or". As used herein, the term "and/or" includes any and all combinations of one or more of the associated listed items. Expressions such as "at least one of" when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" as used herein means a straight or branched chain, saturated, monovalent hydrocarbon group (e.g., methyl or hexyl).

"Aryl" means a monovalent group formed by the removal of one hydrogen atom from one or more rings of an arene (e.g., phenyl or napthyl).

"Alkoxy" means an alkyl group that is linked via an oxygen (i.e., alkyl-O—), for example methoxy, ethoxy, and sec-butyloxy groups.

The prefix "hetero" means that the compound or group includes at least one a heteroatom (e.g., 1, 2, or 3 heteroatom(s)), wherein the heteroatom(s) is each independently N, O, S, Si, or P.

"Cycloalkyl" means a monovalent group having one or more saturated rings in which all ring members are carbon (e.g., cyclopentyl and cyclohexyl).

Hereinafter, exemplified lithium air batteries and methods of manufacturing the same are described in further detail by referring to the appended drawings.

Provided is a lithium air battery including: a lithium negative electrode; a positive electrode; and an ion conductive oxygen-blocking film is formed on the lithium negative electrode, wherein the ion conductive oxygen-blocking film includes a first polymer including a polyvinyl alcohol or a polyvinyl alcohol blend, and a lithium salt, and wherein the ion conductive oxygen-blocking film has an oxygen transmission rate of about 10 mL/m$^2$ day (milliliters per square meter per day) to about 10,000 mL/m$^2$ day.

The ion conductive oxygen-blocking film has improved oxygen-blocking properties and ion conductivity suitable for a lithium air battery. For example, such an ion conductive oxygen-blocking film has an oxygen transmission rate of about 30 mL/m$^2$ day to about 4,000 mL/m$^2$ day, or about 50 mL/m$^2$ day to about 2000 mL/m$^2$ day, or about 80 mL/m$^2$ day to about 1000 mL/m$^2$ day.

The lithium negative electrode includes lithium metal or a lithium metal alloy.

Lithium air batteries can use a lithium aluminum titanium phosphate (LATP) film that is ceramic material as a lithium negative electrode surface-protecting film. However, the LATP film lowers energy density due to its high weight, and the LATP film is weak and cannot be folded due to its low toughness such that it is difficult to apply the LATP film to a three-dimensional (3D) cell. It is difficult to use the LATP film as an actual separation film since the LATP film does not reach a satisfactory life stability level due to its deteriorated mechanical properties and chemical resistance. Accordingly, an ion conductive oxygen-blocking film can be included in a 3D cell, the conductive oxygen-blocking film having light weight, high mechanical strength, and foldable characteristics to realize a high energy density lithium air battery.

An ion conductive oxygen-blocking film according to an exemplary embodiment has a water content of about 300 parts per million (ppm) or less, for example, about 50 ppm or less, or about 0.0001 ppm to about 100 ppm, about 0.01 ppm to about 75 ppm, or about 0.0001 ppm to about 50 ppm, or about 1 ppm to about 50 ppm, in order to have high oxygen-blocking properties. The ion conductive oxygen-blocking film including a lithium salt has improved ion conductivity. While not wanting to be bound by theory, it is understood that when the water content is controlled to the above-described ranges, the number of free hydroxyl groups existing in polyvinyl alcohol may be increased if the ion conductive oxygen-blocking film includes polyvinyl alcohol as the first polymer. When the number of free hydroxyl groups increases, the oxygen diffusion ratio decreases to obtain an ion conductive oxygen-blocking film having improved oxygen-blocking effects.

While not wanting to be bound by theory, the degree of saponification of the first polymer included in the ion conductive oxygen-blocking film has an important influence on oxygen-blocking properties of the ion conductive oxygen-blocking film by exerting an influence on the number of hydroxyl groups of the first polymer. The first polymer may have a degree of saponification of about 85 mole percent (mol %) or greater. For example, the first polymer may have a degree of saponification of about 85 mol % to about 99.9 mol %, or for example, the first polymer may have a degree of saponification of about 88 mol % to about 98 mol %, or of about 90 mol % to about 96 mol %. When the degree of saponification of the first polymer is within the above-described ranges, the ion conductive oxygen-blocking film may have improved film forming properties and oxygen-blocking properties. Further, not only interfacial characteristics between the ion conductive oxygen-blocking film and a lithium metal electrode are improved, but also the tensile modulus and elongation of the ion conductive oxygen-blocking film are improved.

An ion conductive oxygen-blocking film according to an exemplary embodiment may be oxygen impermeable. The ion conductive oxygen-blocking film may function as a lithium ion conductive solid electrolyte film and it may perform a role of protecting the lithium negative electrode such that oxygen is not directly brought into contact with a lithium negative electrode. Further, the ion conductive oxygen-blocking film may function as an oxygen-blocking polymer electrolyte film by directly using the ion conductive oxygen-blocking film instead of an electrolyte in a negative electrode since the ion conductive oxygen-blocking film is electrochemically stable.

The ion conductive oxygen-blocking film has an ion conductivity of about $1 \times 10^{-7}$ Siemens per centimeter (S/cm) or greater. For example, the ion conductive oxygen-blocking film has improved ion conductivity and has an ion conductivity of about $1 \times 10^{-7}$ S/cm or greater at 25° C., or about $1 \times 10^{-6}$ S/cm or greater at 25° C. The ion conductive oxygen-blocking film can have an ion conductivity of about $1 \times 10^{-4}$ S/cm or greater at 60° C., or about $5 \times 10^{-5}$ S/cm or greater at 60° C., or about $1 \times 10^{-6}$ S/cm or greater at 60° C. The ion conductive oxygen-blocking film can have an ion conductivity of about $1 \times 10^{-7}$ S/cm to about $1 \times 10^{-4}$ S/cm, or about $5 \times 10^{-6}$ S/cm to about $5 \times 10^{-5}$ S/cm. Further, the lithium air battery including the ion conductive oxygen-blocking film may have a very high energy density since the ion conductive oxygen-blocking film has a low weight, compared to LATP, which is used for current oxygen-blocking films. Energy density of a lithium air battery can be determined after 500 charge/discharge cycles or more using a charge/discharge of about 10 Wh/kg. Alternatively, the energy density of the lithium air battery can be determined after 200 charge/discharge cycles or more using a charge/discharge of about 37 Wh/kg.

The ion conductive oxygen-blocking film is applicable to the 3D cell since the ion conductive oxygen-blocking film has improved mechanical properties, such as tensile modulus and elongation, as described above, and has foldable characteristics. The ion conductive oxygen-blocking film can have an elongation of about 300% or greater at about 25° C. For example, the ion conductive oxygen-blocking film can have an elongation of about 350% or greater at about 25° C. For example, the ion conductive oxygen-blocking film can have an elongation of about 300% to about 1000% at 25° C., or about 300% to about 700% at 25° C., or about 400% to about 700% at 25° C. The ion conductive oxygen-blocking film with such an elongation has merits in that it has improved ductility such that it has good workability, and it is stable with respect to volume changes during charging and discharging. The ion conductive oxygen-blocking film has a tensile modulus of about 10 megaPascals (MPa) or greater at 25° C. For example, the ion conductive oxygen-blocking film has a tensile modulus of about 10 MPa to about 1000 MPa at 25° C., or about 20.0 MPa to about 500 MPa at 25° C., or about 50 MPa to about 300 MPa at 25° C. The tensile modulus is a Young's modulus.

The ion conductive oxygen-blocking film may be thin or thick, compared to a lithium negative electrode. For example, the ion conductive oxygen-blocking film may have a thickness of about 5 micrometers (μm) to about 250 μm. For example, an ion conductive oxygen-blocking film according to an exemplary embodiment has a thickness of about 20 μm to about 300 μm, or about 60 μm to about 150 μm, or about 80 μm to about 130 μm. The ion conductive oxygen-blocking film can be thicker than a lithium negative electrode. When the thickness of the ion conductive oxygen-blocking film is in the above-described ranges, the ion conductive oxygen-blocking film has improved mechanical properties without increasing an interfacial resistance between the ion conductive oxygen-blocking film and the lithium negative electrode and/or an interfacial resistance between the ion conductive oxygen-blocking film and the positive electrode.

If a lithium negative electrode including an ion conductive oxygen-blocking film according to an exemplary embodiment is used, a lithium metal deposition is uniformly formed during charging and discharging of the battery and the lithium of the lithium metal electrode is stabilized due to strong adhesive strength provided by a polyvinyl alcohol or a polyvinyl alcohol. As a result, the long-term performance of a lithium air battery may be improved. Further, the ion conductive oxygen-blocking film is easily coated on the surface of a lithium metal, the ion conductive oxygen-blocking film has improved film stability, and the ion conductive oxygen-blocking film not only is stable to volume changes during charging and discharging processes, but also has improved solubility in a lithium salt. Thus, the ion conductive oxygen-blocking film has improved ion conductivity.

A first polymer included in the ion conductive oxygen-blocking film may have a weight average molecular weight of about 30,000 Daltons or greater, e.g., about 30,000 Daltons to about 300,000 Daltons, about 50,000 Daltons to about 200,000 Daltons, or about 80,000 Daltons to about 100,000 Daltons. Further, the first polymer has an average polymerization degree of about 1 to about 2000, about 1 to about 1000, or about 10 to about 500. When the weight average molecular weight and average polymerization degree of the first polymer are in the above-described ranges, the ion conductive oxygen-blocking film has improved film forming properties and improved tensile modulus and elongation.

The first polymer has a glass transition temperature of about 20° C. to about 100° C., about 40° C. to about 80° C., or about 50° C. to about 70° C. When the first polymer having such a glass transition temperature is used, the ion conductive oxygen-blocking film has improved thermal characteristics. Therefore, when a negative electrode including such an ion conductive oxygen-blocking film is used, a lithium air battery having improved cycle characteristics may be manufactured.

An ion conductive oxygen-blocking film according to an exemplary embodiment is disposed on a lithium negative electrode. For example, the ion conductive oxygen-blocking film may be formed as a continuous or discontinuous coating film. The ion conductive oxygen-blocking film may be disposed on a portion of the surface of a lithium negative electrode or on the entire surface of the lithium negative electrode. For example, the ion conductive oxygen-blocking film may be disposed to cover greater than 0% to 100% or less, for example, about 10% to 100%, about 20% to about 95%, or about 30% to about 90% of an entire surface, e.g., a projected surface, of the lithium negative electrode, e.g., an entire surface of a side of the lithium negative electrode which is adjacent the ion conductive-oxygen blocking film, e.g. opposite a current collector. Further, the ion conductive oxygen-blocking film includes at least one of a first polymer selected from a polyvinyl alcohol and a polyvinyl alcohol blend having inexpensive production cost. The first polymer includes a polyvinyl alcohol having a hydroxyl group. The polyvinyl alcohol blend includes a polyvinyl alcohol, and a second polymer having improved miscibility with polyvinyl alcohol.

Examples of the second polymer may include at least one selected from an acryl-based resin, a methacryl-based resin, and polyacrylonitrile. Examples of the second polymer may include at least one selected from polymethyl methacrylate, polymethyl acrylate, polyethyl methacrylate, polyethyl acrylate, polypropyl methacrylate, polypropyl acrylate, polybutyl acrylate, polybutyl methacrylate, polypentyl methacrylate, polypentyl acrylate, polycyclohexyl methacrylate, polycyclohexyl acrylate, polyhexyl methacrylate, polyhexyl acrylate, polyglycidyl acrylate, polyglycidyl methacrylate, and polyacrylonitrile.

The amount of the second polymer may be in a range of about 0.1 part by weight to about 100 parts by weight, about 20 parts by weight to about 100 parts by weight, or about 40 parts by weight to about 80 parts by weight, based on 100 parts by weight of the polyvinyl alcohol.

The amount of the lithium salt is included in the ion conductive oxygen-blocking film in a range of about 20 parts by weight to about 200 parts by weight, about 30 parts by weight to about 170 parts by weight, or about 50 parts by weight to about 120 parts by weight, based on 100 parts by weight of the first polymer.

Further, for example, a molar ratio of a hydroxyl group of a polyvinyl alcohol in the first polymer of the ion conductive oxygen-blocking film to lithium may be selected to be in a range of about 1:0.05 to about 1:0.5, about 1:0.078 to about 1:0.39, or about 1:0.1 to about 1:0.3. When the amount of the lithium salt is in the range above, and the hydroxyl group and lithium are in the molar ratio range, the ion conductive oxygen-blocking film has improved ion conductivity and also has improved mechanical properties and oxygen-blocking properties.

Examples of the lithium salt may include at least one selected from LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N (hereinafter, referred to as "LiTFSI"), LiC(CF$_3$SO$_2$)$_3$, LiC(CF$_3$CF$_2$SO$_2$)$_3$, LiN(SO$_2$C$_2$F$_5$)$_2$, LiN(SO$_2$F)$_2$ (hereinafter, referred to as "LiFSI"), LiN(CF$_3$SO$_2$)(CF$_3$CF$_2$CF$_2$CF$_2$SO$_2$), LiPF$_3$(C$_2$F$_5$)$_3$, LiPF$_3$(CF$_3$)$_3$, LiF, and LiSbF$_6$.

Examples of the lithium salt may include a fluorine-containing sulfone compound comprising at least one selected from LiN(CF$_3$SO$_2$)$_2$, LiN(SO$_2$F)$_2$, LiN(CF$_3$SO$_2$)(CF$_3$CF$_2$CF$_2$CF$_2$SO$_2$), LiN(CF$_3$CF$_2$SO$_2$)$_2$, LiC(CF$_3$SO$_2$)$_3$, and LiC(CF$_3$CF$_2$SO$_2$)$_3$. When the fluorine-containing sulfone compounds are used as a lithium salt, a film having much improved ion conductivity may be prepared.

LiTFSI in the above-described fluorine-containing sulfone compounds has improved stability to oxygen compared to LiFSI, which can be confirmed by cyclic voltammetry. However, the ion conductive oxygen-blocking film according to an exemplary embodiment including LiFSI as a lithium salt has improved oxygen-blocking properties compared to the ion conductive oxygen-blocking film including LiTFSI.

The existence of a first polymer such as a polyvinyl alcohol, and a second polymer may be confirmed through surface analyses such as X-ray photoelectron spectroscopy (XPS) analysis and a Fourier Transform Infrared Spectrometer (FT-IR) of the ion conductive oxygen-blocking film, and chemical analysis by Nuclear Magnetic Resonance Spectroscopy (NMR), or Differential Scanning calorimetry (DSC).

The lithium negative electrode may have a thickness of about 300 μm or less. For example, the lithium negative electrode may have a thickness of about 150 μm or less. For example, the lithium negative electrode may have a thickness of about 60 μm or less. For example, the lithium negative electrode may have a thickness of about 0.01 μm to about 50 μm, or about 0.1 μm to about 20 μm, or about 1 μm to about 10 μm.

The ion conductive oxygen-blocking film may additionally include at least one selected from an inorganic particle, an ionic liquid, a polymeric ionic liquid, and an oligomer. Examples of the inorganic particle may include at least one selected from $SiO_2$, $SnO_2$, $TiO_2$, ZnO, $Al_2O_3$, $Mn_2O_3$, $MnO_2$, $BaTiO_3$, a carbon nanotube, $Fe_2O_3$, CuO, a cage-structured silsesquioxane, and a metal-organic framework (MOF).

The amount of inorganic particles may be in a range of about 1 part by weight to about 99 parts by weight, about 5 parts by weight to about 20 parts by weight, or about 8 parts by weight to about 15 parts by weight, based on 100 parts by weight of the first polymer. When the amount of the inorganic particles is in the range above, the ion conductive oxygen-blocking film may have improved mechanical properties.

When the ion conductive oxygen-blocking film according to an exemplary embodiment additionally includes the inorganic particles, mechanical properties of the ion conductive oxygen-blocking film may be improved. The average particle diameter of the inorganic particles may be in a range of about 500 nanometers (nm) or less, e.g., about 1 nm to about 100 nm, for example, about 5 nm to about 70 nm. For example, the average particle diameter of the inorganic particles may be in a range of about 30 nm to about 70 nm. When the particle diameter of the inorganic particles is in the ranges above, an ion conductive oxygen-blocking film having improved film forming properties and mechanical properties may be prepared.

An ionic liquid is said to be a salt in a liquid state at room temperature or a molten salt at room temperature which has a melting point of room temperature or less and consists of ions only. Examples of the ionic liquid may include at least one compound including: i) at least one cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation; and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^-$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$. The ionic liquid may have at least one selected from cations represented by the following Formula 1,

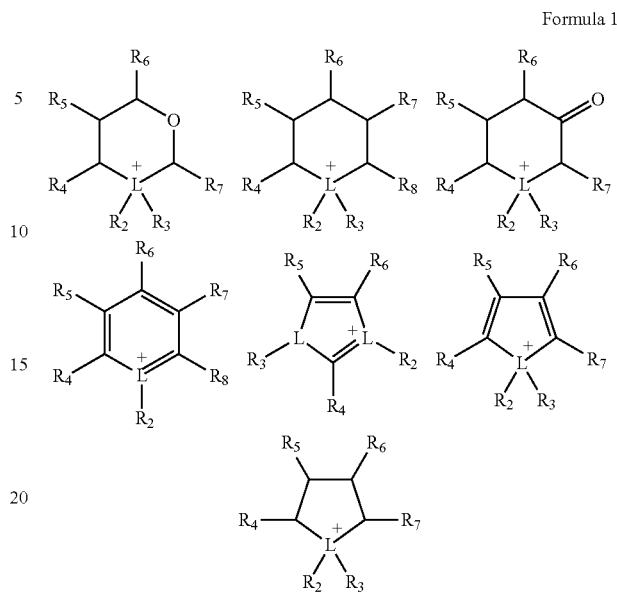

Formula 1 wherein L represents N or P, and $R_2$ to $R_8$ may each be independently a hydrogen, a substituted or unsubstituted C1-C30 alkyl group, a substituted or unsubstituted C1-C30 alkoxy group, a substituted or unsubstituted C6-C30 aryl group, a substituted or unsubstituted C6-C30 aryloxy group, a substituted or unsubstituted C3-C30 heteroaryl group, a substituted or unsubstituted C3-C30 heteroaryloxy group, a substituted or unsubstituted C4-C30 cycloalkyl group, or a substituted or unsubstituted C3-C30 heterocycloalkyl group.

The amount of the ionic liquid is in a range of about 5 parts by weight to about 40 parts by weight, about 10 parts by weight to about 20 parts by weight, or about 13 parts by weight to about 17 parts by weight, based on 100 parts by weight of the first polymer. When the amount of the ionic liquid is in the ranges above, an ion conductive oxygen-blocking film having improved mechanical properties may be obtained.

Examples of the ionic liquid may include at least one selected from N-methyl-N-propylpyrroldinium bis(trifluoromethanesulfonyl)imide, N-butyl-N-methylpyrrolidinium bis(3-trifluoromethanesulfonyl)imide, 1-butyl-3-methylimidazolium bis(trifluoromethylsulfonyl)imide, and 1-ethyl-3-methylimidazolium bis(trifluoromethylsulfonyl)imide.

When the ion conductive oxygen-blocking film includes an ionic liquid and a lithium salt, a molar ratio of the ionic liquid (IL) to lithium ions (Li), abbreviated IL/Li, may be about 0.1 to about 2, e.g., about 0.2 to about 1.8, or about 0.4 to about 1.5. The ion conductive oxygen-blocking film having such a molar ratio has improved lithium ion mobility and ion conductivity, and also has improved mechanical properties.

For example, an oligomer including ethylene oxide and having suitable lithium ion conductivity may have a weight average molecular weight of about 200 Daltons (Da) to about 2000 Da, about 250 Da to about 1800 Da, or about 300 Daltons (Da) to about 1500 Da.

Examples of the oligomer may include at least one selected from polyethylene glycol dimethyl ether and polyethylene glycol diethyl ether.

The amount of oligomer is in a range of about 5 parts by weight to about 50 parts by weight, e.g., about 10 parts by weight to about 30 parts by weight, or about 15 parts by weight to about 25 parts by weight, based on 100 parts by weight of the first polymer. When the oligomer is added to the ion conductive oxygen-blocking film in the amount ranges above, the ion conductive oxygen-blocking film may have improved film forming properties, mechanical properties, and ion conductivity properties.

The above-described ion conductive oxygen-blocking film may be prepared as a free standing-type film, and may be used a separator of positive and negative electrodes as well as a protection film of lithium metal in a lithium air battery.

The ion conductive oxygen-blocking film additionally includes a nonconductive separator, and the nonconductive separator supports the first polymer and the lithium salt. When the first polymer and the lithium salt are supported on the nonconductive separator, there is a merit that the ion conductive oxygen-blocking film is utilizable as an ionic separator with little weight.

The nonconductive separator includes at least one selected from polyethylene, polypropylene, a vinyl-based resin (e.g., a polyvinyl chloride or polyvinyl acetate), polyfluoroethylene-based resin, and polyimide.

The lithium air battery may additionally include a first electrolyte which is disposed between the lithium negative electrode and the ion conductive oxygen-blocking film.

The first electrolyte can be at least one selected from a liquid electrolyte, an inorganic electrolyte, a polymer electrolyte, and an organic/inorganic composite electrolyte.

The inorganic electrolyte may include at least one selected from a glassy or amorphous electrolyte, a ceramic electrolyte, and a glass-ceramic electrolyte.

Although examples of the inorganic electrolyte may include at least one selected from $Cu_3N$, $Li_3N$, LiPON, $Li_3PO_4.Li_2S.SiS_2$, $Li_2S.GeS_2.Ga_2S_3$, $Li_2O.11Al_2O_3$, $Na_2O.11Al_2O_3$, $(Na,Li)_{1+x}Ti_{2-x}Al_x(PO_4)_3$ ($0.1 \leq x \leq 0.9$), $Li_{1+x}Hf_{2-x}Al_x(PO_4)_3$ ($0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a sodium-silicate, $Li_{0.3}La_{0.5}TiO_3$, $Na_5MSi_4O_{12}$ (M is rare earth elements such as Nd, Gd, or Dy) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ ($X \leq 0.8$, $0 \leq Y \leq 1.0$, M is Nd, Sm, Eu, Gd, Tb, Dy, Ho, Er, Tm or Yb), $Li_{1+x+y}Q_x Ti_{2-x}Si_yP_{3-y}O_{12}$ ($0 < x \leq 0.4$, $0 < y \leq 0.6$, Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (M is Nb, or Ta), and $Li_{7+x}A_xLa_{3-x}Zr_2O_{12}$ ($0 < x < 3$, A is Zn), the inorganic electrolyte is not limited thereto. The examples of the inorganic electrolyte may include any suitable electrolyte if it is usable as an inorganic electrolyte in the art.

The polymer electrolyte may include a polymer and a lithium salt. In the polymer electrolyte, the weight average molecular weight of the polymer may be in a range of about 1,000 Daltons to about 600,000 Daltons, about 2,000 Daltons to about 400,000 Daltons, or about 5,000 Daltons to about 200,000 Daltons. When the weight average molecular weight of polymer is in the range above, the polymer has improved ion conductivity without difficulties in the formation of the polymer.

The polymer electrolyte may include at least one selected from an ionically conducting polymer, a polymeric ionic liquid, and a gel-type organic electrolyte.

Examples of the ionically conducting polymer may include at least one selected from polyethylene oxide (PEO), polypropylene oxide, polyvinyl alcohol (PVA), polyvinyl pyrrolidone (PVP), and Li-substituted Nafion. However, the ionically conducting polymer is not limited thereto, and the examples of the ionically conducting polymer may include any suitable polymer if it is usable as an ionically conducting polymer in the art.

Examples of the polymeric ionic liquid may include compounds obtained by polymerizing ionic liquid monomers, and compounds obtained in the form of a polymer. There are advantages that such a polymeric ionic liquid has, such as a high solubility with respect to an organic solvent, and ion conductivity of the electrolyte may be further improved by adding the polymeric ionic liquid to an electrolyte.

When the above-described ionic liquid monomers are polymerized to obtain a polymeric ionic liquid, a polymerization reaction-completed product undergoes cleaning and drying processes. Then the product undergoes an anion substitution reaction to prepare a polymeric ionic liquid such that the polymeric ionic liquid has appropriate anions that are capable of imparting solubility to an organic solvent. A polymeric ionic liquid according to an exemplary embodiment may include repeating units including i) at least one cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5 PF^-$, $(CF_3)_6P^-$, $SF_5CF_2SO_3^-$, $SF_5CHFCF_2SO_3^-$, $CF_3CF_2 (CF_3)_2CO^-$, $(CF_3SO_2)_2CH^-$, $(SF_5)_3C^-$, and $(O(CF_3)_2C_2 (CF_3)_2O)_2PO^-$.

A polymeric ionic liquid according to other exemplary embodiments may be prepared by polymerizing ionic liquid monomers. The ionic liquid monomer has a polymerizable functional group such as a vinyl group, an allyl group, an acrylate group, a methacrylate group. Also, the ionic liquid monomers may include at least one cation selected from an ammonium cation, a pyrrolidinium cations, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and the above-described anion.

Examples of the polymeric ionic liquid include a cation selected from poly(1-vinyl-3-alkylimidazolium), poly(1-allyl-3-alkylimidazolium), and poly(1-(methacryloyloxy)-3-alkylimidazolium), and an anion selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

Examples of the polymeric ionic liquid (PIL) may include at least one selected from poly(diallyldimethylammonium bis(trifluoromethanesulfonyl)imide), and poly(1-allyl-3-methylimidazolium bis(trifluoromethanesulfonyl)imide). However, the PIL is not limited thereto, and the PIL may include any suitable polymeric ionic liquids if they are usable as a PIL in the art.

Examples of the organic/inorganic composite electrolyte, as an electrolyte which includes an organic electrolyte and an inorganic electrolyte at the same time, and in which the organic electrolyte and the inorganic electrolyte are combined with each other, may include at least one of an ionically conducting polymer, PIL, and an inorganic electrolyte. However, the organic/inorganic composite electrolyte is not limited thereto, and the organic/inorganic composite electrolyte may include any suitable electrolyte if it is usable as an organic/inorganic composite electrolyte in the art.

Examples of the liquid electrolyte may include at least one of an ionic liquid, a nonaqueous solvent, and a lithium salt.

An aprotic solvent may be used as the nonaqueous solvent. Examples of the nonaqueous solvent may include at least one selected from a carbonate solvent, an ester solvent, an ether solvent, a ketone solvent, an amine solvent, a glyme solvent, a dioxolane solvent, and a phosphine solvent.

Examples of the carbonate solvent may include at least one selected from dimethyl carbonate (DMC), diethyl carbonate (DEC), ethyl methyl carbonate (EMC), dipropyl carbonate (DPC), methyl propyl carbonate (MPC), ethyl propyl carbonate (EPC), ethylene carbonate (EC), propylene carbonate (PC), and butylene carbonate (BC).

Examples of the ester solvent may include at least one selected from methyl acetate, ethyl acetate, n-propyl acetate, t-butyl acetate, methyl propionate, ethyl propionate, γ-butyrolactone, decanolide, valerolactone, mevalonolactone, and caprolactone.

Examples of the ether solvent may include at least one selected from dibutyl ether, tetraglyme, diglyme, dimethoxy ethane, 2-methyltetrahydrofuran, and tetrahydrofuran. Examples of the ketone solvent may include cyclohexanone.

Examples of the amine solvent may include triethyl amine and triphenyl amine. Examples of the phosphine solvent may include triethyl phosphine. However, the amine solvent and the phosphine solvent are not limited thereto, and they may include any suitable solvent if it is a usable aprotic solvent in the art.

Further, examples of the aprotic solvent may include at least one selected from nitriles such as compounds of the formula R—CN, an amide such as dimethyl formamide, a dioxolane such as 1,3-dioxolane, and a sulfolane, wherein R is a straight chain, branched chain, or cyclic C2-C30 hydrocarbon group, and may include a double bond, an aromatic ring, or an ether bond.

The aprotic solvent may be used independently or in the form of a mixture of at least two thereof, a mixing ratio of the aprotic solvents may be appropriately adjusted depending on the performance of a battery when the aprotic solvents are used, the details of which can be determined by one of skill in the art without undue experimentation.

Examples of the glyme solvent may include at least one selected from poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), and poly(ethylene glycol) diacrylate (PEGDA).

Examples of the dioxolane compound may include at least one selected from 1,3-dioxolane, 4,5-diethyl-1,3-dioxolane, 4,5-dimethyl-1,3-dioxolane, 4-methyl-1,3-dioxolane, and 4-ethyl-1,3-dioxolane.

Examples of the organic solvent may include at least one selected from 2,2-dimethoxy-2-phenylacetophenone, dimethoxyethane, diethoxyethane, tetrahydrofuran, and γ-butyrolactone.

A combination comprising at least two of the foregoing may be used.

The lithium air battery may additionally include a second electrolyte which is disposed between the ion conductive oxygen-blocking film and the positive electrode, wherein the second electrolyte may be at least one selected from an ionic liquid, an inorganic electrolyte, a polymer electrolyte, and an organic/inorganic electrolyte.

The positive electrode includes at least one selected from an ionic liquid and a polymer electrolyte, wherein the ionic liquid and the polymer electrolyte may be the same as those described above.

Since the ion conductive oxygen-blocking film has high oxygen-blocking properties and ion conductivity and improved stability, a lithium air battery having improved cell performance may be manufactured when using the positive electrode including the at least one of the ionic liquid and the polymer electrolyte.

For example, the positive electrode may have a specific capacity of about 100 milliAmpere-hours per gram of cathode ($mAh/g_{cathode}$) to about 100,000 $mAh/g_{cathode}$, about 300 milliAmpere-hours per gram of cathode ($mAh/g_{cathode}$) to about 50,000 $mAh/g_{cathode}$, or about 1000 milliAmpere-hours per gram of cathode ($mAh/g_{cathode}$) to about 20,000 $mAh/g_{cathode}$. As described above, an ion conductive oxygen-blocking film according to an exemplary embodiment is a stable electrolyte that does not have an effect on the specific capacity realization of the positive electrode.

A lithium air battery according to an exemplary embodiment may also include a separator disposed between the ion conductive oxygen-blocking film and the positive electrode. Any suitable separator may be used and the separator composition is not limited as long as the separator has a composition capable of function in the application range of the lithium air battery. Examples of the separator may include at least one selected from polymer nonwoven fabrics such as polypropylene nonwoven fabrics and polyphenylene sulfide nonwoven fabrics, and porous films of olefin resins such as polyethylene and polypropylene.

A lithium air battery according to an exemplary embodiment may have a structure in which i) a lithium negative electrode, ii) an ion conductive oxygen-blocking film including at least first polymer selected from a polyvinyl alcohol and a polyvinyl alcohol blend, and iii) a positive electrode are sequentially laminated.

A lithium air battery according to an exemplary embodiment may additionally include a lithium ion conductive solid electrolyte besides the above-described ion conductive oxygen-blocking film. For example, the lithium ion conductive solid electrolyte may include the lithium ion conductive crystal in an amount of about 50% by weight or more, about 55% by weight or more, or about 60% by weight or more, based on a total weight of the lithium ion conductive solid electrolyte, since a high ion conductivity is obtained when the lithium ion conductive solid electrolyte includes a large amount of a lithium ion conductive crystal.

Examples of the lithium ion conductive crystal may include perovskite structured crystals having lithium ion conductivity such as $Li_3N$, a LISICON, $La_{0.55}Li_{0.35}TiO_3$, a NASICON type structured $LiTi_2P_3O_{12}$, and a glass-ceramic for precipitating these crystals.

Examples of the lithium ion conductive crystal may include $Li_{1+x+y}(Al, Ge)_x(Ti, Ge)_{2-x}Si_yP_{3-y}O_{12}$, wherein $0 \le x \le 1$, $0 \le y \le 1$, e.g., $0 \le x \le 0.4$, $0 \le y \le 0.6$, or $0.1 \le x \le 0.3$, $0.1 \le y \le 0.4$. While not wanting to be bound by theory, in order for the lithium ion conductive crystal to have a high ion conductivity, the lithium ion conductive crystal should not have grain boundaries that interrupt ionic conduction. For example, the glass-ceramics may have improved chemical stability as well as ion conductivity since the glass-ceramics hardly have any pores or grain boundaries that interrupt ionic conduction.

Examples of the lithium ion conductive glass-ceramic may include at least one selected from lithium-aluminum-germanium-phosphate (LAGP), lithium-aluminum-titanium-phosphate (LATP), and lithium-aluminum-titanium-silicon-phosphate (LATSP).

For example, a mother glass may comprise a $Li_2O$—$Al_2O_3$—$TiO_2$—$SiO_2$—$P_2O_5$ composition. A primary crystal phase may have the formula $Li_{1+x+y}Al_xTi_{2-x}Si_yP_{3-y}O_{12}$ ($0 \leq x \leq 1$ and $0 \leq y \leq 1$) when the mother glass is heat-treated and crystallized, wherein, for example, x and y are $0 \leq x \leq 0.4$ and $0 < y \leq 0.6$, or $0.1 \leq x \leq 0.3$ and $0.1 < y \leq 0.4$. Here, pores or grain boundaries interrupting ionic conduction are defined as ionic conduction interrupting materials. Such ionic conduction interrupting materials have pores or grain boundaries which decrease conductivity of an entire inorganic material including a lithium ion conductive crystal to a value of about 1/10 or less with respect to a conductivity of the lithium ion conductive crystal itself in the inorganic material.

A lithium ion conductive solid electrolyte may comprise $Li_{1+x+y}Al_xTi_{2-x}Si_yP_{3-y}O_{12}$ ($0 \leq x \leq 1$ and $0 \leq y \leq 1$), wherein, for example, x and y are $0 \leq x \leq 0.4$ and $0 < y \leq 0.6$, or $0.1 \leq x \leq 0.3$ and $0.1 < y \leq 0.4$.

Examples of the lithium ion conductive solid electrolyte may be a solid electrolyte including $Li_{1+x+y}Al_x(Ti,Ge)_{2-x}Si_yP_{3-y}O_1$ ($0 \leq x \leq 2$ and $0 \leq y \leq 3$), and for example including LATP($Li_{1.4}Ti_{1.6}Al_{0.4}P_3O_{12}$).

An ion conductive oxygen-blocking film according to an exemplary embodiment may have improved ion conductivity and lithium ion mobility, improved mechanical properties, and improved stability to the liquid electrolyte. While not wanting to be bound by theory, problems in product life and stability of a lithium air battery caused by dendrites formed due to a high reactivity of lithium may be prevented in advance when such an ion conductive oxygen-blocking film is used. FIG. 1 schematically exhibits a lithium air battery according to an exemplary embodiment.

An exemplary embodiment of the lithium air battery is schematically illustrated in FIG. 1. The lithium air battery 10 has a structure including a positive electrode 14 using oxygen as an active material and disposed adjacent to a first current collector (not illustrated), a lithium negative electrode 13 disposed adjacent to a second current collector (not illustrated), and an ion conductive oxygen-blocking film 15 disposed adjacent to the lithium negative electrode 13. The ion conductive oxygen-blocking film 15 simultaneously performs roles of an interlayer, and a separator for electrically separating the positive electrode and the negative electrode. Therefore, existence of the ion conductive oxygen-blocking film enables manufacturing of a solid type lithium air battery even without a separate interlayer or separator.

The lithium air battery may additionally include a second electrolyte between the positive electrode and the ion conductive oxygen-blocking film, and a first electrolyte (not illustrated) may be additionally disposed between the lithium negative electrode 13 and the ion conductive oxygen-blocking film 15. If the lithium air battery additionally includes the first electrolyte, a side reaction between the negative electrode and the ion conductive oxygen-blocking film may be prevented.

A porous carbon paper (not illustrated) that is a gas diffusion layer may be additionally disposed between the first current collector (not illustrated) and the positive electrode 14. The first current collector is disposed adjacent to a gas diffusion layer that is porous such that the first current collector enables the diffusion of air.

A pressing member 17 for delivering air to the positive electrode 15 is disposed on the first current collector (not illustrated). A case 11 comprising an insulating resin maybe interposed between the positive electrode 14 and the lithium negative electrode 13 to electrically separate the positive electrode and the negative electrode. Air is supplied via an air inlet 16a and exhausted via an air outlet 16b. The lithium air battery may be accommodated in a stainless steel reactor.

The term "air" used in the present disclosure is not limited to the atmospheric air, but may include combinations of gases including oxygen, and pure oxygen gas. A wide definition about such a term "air" may be applied to all uses, e.g., an air battery or an air positive electrode.

The lithium air battery is usable to both a lithium primary battery and a lithium secondary battery. Further, the shape of the lithium air battery is not particularly limited. Examples of the shape of the lithium air battery may include a coin type, a button type, a sheet type, a laminate type, a cylinder type, a flat type, or a cone type. Further, the examples of the lithium air battery may be applicable to large batteries used in electric vehicles, etc.

A lithium air battery according to an exemplary embodiment may be manufactured as follows.

An ion conductive oxygen-blocking film is formed by disposing a composition for forming an ion conductive oxygen-blocking film on a substrate to form a coating, wherein the composition includes a first polymer including a polyvinyl alcohol or a polyvinyl alcohol blend, a lithium salt, and an organic solvent; and drying the coating to form an ion conductive oxygen-blocking film, wherein the drying occurs after the disposing.

According to other exemplary embodiments, an ion conductive oxygen-blocking film may be formed by disposing the above-described composition for forming the ion conductive oxygen-blocking film on a lithium negative electrode to form a coating; and drying the coating to form an ion conductive oxygen-blocking film, wherein the drying occurs after the disposing.

The composition may be prepared by adding a lithium salt to the polyvinyl alcohol solution or the polyvinyl alcohol blend solution after obtaining a polyvinyl alcohol solution or a polyvinyl alcohol blend solution by mixing at least one first polymer selected from a polyvinyl alcohol and a polyvinyl alcohol blend with an organic solvent.

Examples of the organic solvent may include at least one selected from tetrahydrofuran, N-methyl pyrrolidone, acetonitrile, benzonitrile, 2-methyltetrahydrofuran, γ-butyrolactone, dioxolane, 4-methyl dioxolane, N, N-dimethylformamide, N, N-dimethylacetamide, dimethyl sulfoxide, dioxane, 1,2-dimethoxyethane, sulfolane, dichloroethane, chlorobenzene, nitrobenzene, diethylene glycol, and dimethyl ether. The amount of organic solvent is in a range of about 50 parts by weight to about 5,000 parts by weight, about 100 parts by weight to about 3,000 parts by weight, or about 200 parts by weight to about 1,000 parts by weight, based on 100 parts by weight of the first polymer.

The mixing process may be performed at about 25° C. to about 100° C., about 50° C. to about 100° C. or about 70° C. to about 90° C.

The composition for forming the ion conductive oxygen-blocking film may additionally include at least one selected from an ionic liquid, a PIL, inorganic particles, and an oligomer.

When the composition for forming the ion conductive oxygen-blocking film is used to form a film type ion conductive oxygen-blocking film, the ion conductive oxygen-blocking film is formed by disposing the composition for forming the ion conductive oxygen-blocking film on a substrate to form a coating, and drying the coating to form the ion conductive oxygen-blocking film. Examples of the substrate include a lithium negative electrode, a Mylar film, a polyethylene terephthalate film, and a Petri dish. The substrate may be a lithium negative electrode.

According to other exemplary embodiments, the composition for forming the ion conductive oxygen-blocking film is disposed on a lithium negative electrode to form a coating, and coating is dried to form an ion conductive oxygen-blocking film.

The drying process may be performed at about 20° C. to about 80° C. For example, the drying process may include a heat-treating at about 60° C., and heat-treating at about 20° C. to about 80° C., about 30° C. to about 70° C., or about 50° C. to about 70° C., e.g., at about 60° C. in a vacuum atmosphere. For example, the vacuum drying process may be performed at about 60° C. and at a vacuum pressure of about −0.1 MPa for about 1 hour to about 10 hours, about 2 hours to about 8 hours, or about 3 hours to about 7 hours, e.g., for about 5 hours.

When the above-described drying process is performed, an ion conductive oxygen-blocking film having a water content of about 300 ppm or less, about 200 ppm or less, or about 100 ppm or less, e.g., about 50 ppm, or about 1 ppm to about 300 ppm, or about 2 ppm to about 250 ppm, is obtained. If the ion conductive oxygen-blocking film is directly coated on the surface of a lithium negative electrode, the above-described drying process may be controlled within a range which suppresses deformation of the lithium negative electrode.

Examples of a method of coating the composition for forming the ion conductive oxygen-blocking film may include any suitable method of methods that are usable when forming the ion conductive oxygen-blocking film. Examples of the method of coating the composition for forming the ion conductive oxygen-blocking film may include methods such as spin coating, roll coating, curtain coating, extrusion, casting, screen printing, ink jet printing, and doctor blading.

A lithium negative electrode is prepared. A lithium thin film or a lithium alloy electrode is used as the lithium negative electrode. The lithium alloy includes lithium, and metals/metalloids that are alloyable with lithium. Examples of the metals/metalloids that are alloyable with lithium may include at least one selected from Si, Sn, Al, Ge, Pb, Bi, Sb, Si-A alloys (A is an alkali metal, an alkaline earth metal, a Group 13 to 16 element, a transition metal, a rare earth element, or combined elements thereof with A not being Si), Sn-A alloys (A is an alkali metals, an alkaline earth metals, a Group 13 to 16 element, a transition metal, a rare earth element or combined elements thereof with A not being Sn). Examples of the element A may include at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, and Po.

Separately from this, a positive electrode using oxygen as a positive electrode active material is prepared.

The positive electrode may include a conductive material as porous material. The porous material may include any suitable materials without limitation if the materials have suitable conductive properties. For example, the carbonaceous material may be used as the porous material. Examples of the carbonaceous material may include at least one selected from a carbon black carbonaceous material, a graphite carbonaceous material, a graphene carbonaceous material, an activated carbon carbonaceous material, and a carbon fiber carbonaceous material. For example, although examples of the carbonaceous material may include at least one selected from a carbon nanoparticle, carbon nanotube (e.g., single wall carbon nanotube or multiwall carbon nanotube (SWCNT or MWCNT)), a carbon nanofiber, a carbon nanosheet, a carbon nanobar, and carbon nanobelt, the carbonaceous material is not limited thereto, and examples of the carbonaceous material may include any suitable material if the carbonaceous material is material having nanostructures. The carbonaceous material may have a micro size in addition to the nanostructures. For example, the carbonaceous material may be formed in various forms having a micro size, i.e., particles, tubes, fibers, sheets, bars, or belts.

For example, the carbonaceous material may be mesoporous. For example, the carbonaceous material may be porous partially or entirely. The positive electrode includes porous carbonaceous material such that a porous positive electrode may be formed by employing porosity into the positive electrode. The carbonaceous material has porosity such that the carbonaceous material may have an increased area of contact with an electrolyte. Further, supply and diffusion of oxygen are facilitated in the positive electrode, and the positive electrode may provide a space to which a product produced in the charging and discharging processes is adhered.

Further, examples of the conductive material may include metallic conductive materials such as a metal fiber or a metal mesh. Further, examples of the conductive material may include a metallic powder such as at least one selected from copper, silver, nickel, and aluminum. Examples of the conductive material may include an organic conductive material such as a polyphenylene derivative. The conductive material may be used independently or in the form of a mixture thereof.

The positive electrode may be a composite positive electrode including an electrolyte in addition to a porous material. Examples of the electrolyte may include at least one selected from a polymer electrolyte, an inorganic electrolyte, an organic/inorganic composite electrolyte, and an ionic liquid. While not wanting to be bound by theory, if the positive electrode includes the electrolyte, diffusion of oxygen is facilitated in the positive electrode, and an area of the electrolyte brought into contact with oxygen may be increased.

The positive electrode may have a composition ratio of the porous material to the electrolyte of about 1:1 to about 1:15, about 1:2 to about 1:9, or about 1:4 to about 1:7, based on weight. That is, a lithium air battery having further improved charge/discharge characteristics may be obtained when the content of the electrolyte and the content of the porous material are in a weight ratio of about 100 to about 1500, about 200 to about 900, or about 400 to about 700 parts by weight of the electrolyte to about 100 parts by weight of the porous material.

Examples of the electrolyte may include ionic liquids such as at least one selected from N,N-diethyl-methylamine trifluoromethanesulfonate (DEMA), 1-methyl-3-propylpyrrolidinium bis(trifluoromethanesulfonyl)imide (PP13TFSI), and N-methyl-N-propylpiperidinium bis(trifluoromethanesulfonyl)imide (PP13-TFSI).

The positive electrode may include a catalyst for oxidizing or reducing oxygen, and examples of the catalyst may include precious metal catalysts such as at least one selected from platinum, gold, silver, palladium, ruthenium, rhodium, and osmium, oxide catalysts such as manganese oxide, iron oxide, cobalt oxide, and nickel oxide, and organic metal catalysts such as cobalt phthalocyanine. However, the catalyst is not limited thereto, and examples of the catalyst may include any suitable material that is usable as a catalyst for oxidizing or reducing oxygen in the art.

Further, the catalyst may be supported on a support. Examples of the support may include at least one selected from an oxide, zeolite, a clay mineral, and carbon. Examples of the oxide may include at least one selected from alumina, silica, zirconium oxide, and titanium dioxide. Examples of the oxide may include oxides including at least one metal selected from Ce, Pr, Sm, Eu, Tb, Tm, Yb, Sb, Bi, V, Cr, Mn, Fe, Co, Ni, Cu, Nb, Mo, and W. Examples of the carbon may include carbon blacks such as at least one selected from Ketjen black, acetylene black, channel black, lamp black, a graphites such as natural graphite, artificial graphite, and expanded graphite, activated carbon, and carbon fiber. However, the carbon is not limited thereto, and examples of the carbon may include any suitable carbon material that is usable as the support in the art.

The composite positive electrode may additionally include a binder. The binder may include a thermoplastic resin or a thermosetting resin. Examples of the binder may include at least one selected from polyethylene, polypropylene, polytetrafluoroethylene (PTFE), polyvinylidene fluoride (PVDF), styrene-butadiene rubber, tetrafluoroethylene-perfluoroalkylvinylether copolymers, vinylidene fluoride-hexafluoropropylene copolymers, vinylidene fluoride-chlorotrifluoroethylene copolymers, ethylene-tetrafluoroethylene copolymers, polychlorotrifluoroethylene, vinylidene fluoride-pentafluoropropylene copolymers, propylene-tetrafluoroethylene copolymers, ethylene-chlorotrifluoroethylene copolymers, vinylidene fluoride-hexafluoropropylene-tetrafluoroethylene copolymers, vinylidene fluoride-perfluoromethylvinylether-tetrafluoroethylene copolymers, and ethylene-acrylic acid copolymers. A combination comprising at least one of the foregoing, as a mixture or as a copolymer, may be used. However, the binder is not limited thereto, and examples of the binder may include any suitable materials that are usable as the binder in the art.

For example, the composite positive electrode may be prepared by a method including mixing the catalyst for oxidizing or reducing oxygen, the conductive material, the solid electrolyte, and the binder, adding an appropriate solvent to the mixture to prepare a positive electrode slurry, and coating and drying the positive electrode slurry on the surface of a current collector or selectively compression molding the positive electrode slurry on the current collector to improve density of the electrode. After performing the coating and drying processes, the method may further include a process of irradiating light onto the dried positive electrode slurry on the current collector to prepare the composite positive electrode.

Further, the composite positive electrode may selectively include lithium oxide. Further, the catalyst for oxidizing or reducing oxygen and the binder may selectively be omitted if desired.

Examples of the current collector may include net-shaped or mesh-shaped porous bodies for promptly diffusing oxygen, and porous metal sheets of stainless steel, nickel, or aluminum. However, the current collector is not limited thereto, and examples of the current collector may include any suitable material that is usable as the current collector in the art. The current collector may be covered with an oxidation resistant metal or alloy film for preventing oxidation.

A positive electrode according to an exemplary embodiment may be prepared by mixing a porous carbonaceous material with a positive electrode composition containing an electrolyte at room temperature.

A lithium negative electrode may be installed on one side within a case, an ion conductive oxygen-blocking film may be disposed on the lithium negative electrode, and a positive electrode is disposed on the top of the ion conductive oxygen-blocking film. A carbon paper as a gas diffusion layer and a Ni mesh as a current collector may be sequentially laminated on the positive electrode, and a pressing member for delivering air to the positive electrode may be pressed on the Ni mesh as the current collector to fix a cell such that a lithium air battery is completed.

The case may be divided into a lower part brought into contact with the negative electrode and an upper part brought into contact with the composite positive electrode, and an insulating resin may be interposed between the upper part and the lower part such that the positive electrode and the negative electrode are electrically insulated.

The ion conductive oxygen-blocking film obtained according to the above-described processes, the lithium negative electrode, and the positive electrode are laminated such that a lithium air battery may be manufactured.

For example, the negative electrode may be a lithium metal thin film. Examples of the lithium metal thin film, as lithium metal-based alloys, may include alloys of at least one selected from aluminum, tin, magnesium, indium, calcium, titanium, and vanadium, and lithium.

Further, it is also possible to dispose the separator between the positive electrode and the lithium negative electrode. The separator is not limited if a composition for such a separator is capable of withstanding the use range of a lithium air battery. Examples of the separator may include polymer nonwoven fabrics such as a nonwoven fabric comprising at least one selected from polypropylene, a nonwoven fabric made of polyphenylene sulfide, and a porous films comprising an olefin based resins such as polyethylene and polypropylene.

Hereinafter, a lithium air battery and a method of manufacturing the lithium air battery according to exemplary embodiments of the present disclosure are described more in detail through the following Examples and Comparative Examples. However, such embodiments are provided for illustrative purposes only, and the scope of the present disclosure shall not be limited thereto in any manner. Further, it should be understood that the present disclosure is not limited to the above descriptions and that other various modifications of the present disclosure may occur to persons having ordinary knowledge in the related art of the present disclosure.

EXAMPLES

Example 1

Preparation of an Ion Conductive Oxygen-Blocking Film

Polyvinyl alcohol having a weight average molecular weight of about 93500 Daltons and a degree of saponification of about 99 mol % was dissolved in dimethyl sulfoxide (DMSO), and then the resultant solution was stirred at about 60° C. for about 5 hours to obtain about 5% by weight/volume of a polyvinyl alcohol solution, based on the volume of the solution.

Lithium bisfluorosulfonylimide (LiFSI) was added to the polyvinyl alcohol solution to obtain a composition for forming an ion conductive oxygen-blocking film. A mixing weight ratio of polyvinyl alcohol and lithium salt was about 3:5 in the composition for forming the ion conductive oxygen-blocking film. A hydroxyl group of polyvinyl alcohol and lithium of the lithium salt had a mixing molar ratio of about 1:0.39.

The composition for forming the ion conductive oxygen-blocking film was cast on the top of a Petri dish, and the resultant product was dried at about 60° C. for about 24 hours. Subsequently, the resultant product was dried in a vacuum oven of about 60° C. for about 5 hours, and an ion conductive oxygen-blocking film containing polyvinyl alcohol and LiFSI was separated from the Petri dish. The ion conductive oxygen-blocking film had a thickness of about 120 μm, and the lithium salt was contained in an amount of about 136.67 parts by weight, based on 100 parts by weight of polyvinyl alcohol.

A water content was measured from the ion conductive oxygen-blocking film prepared according to Example 1 according to Karl-Fisher method, and the measurement result was about 15 ppm.

Example 2

Preparation of an Ion Conductive Oxygen-Blocking Film

An ion conductive oxygen-blocking film was prepared by performing the same preparation method as in Example 1 except that a mixing weight ratio of polyvinyl alcohol and lithium salt was changed to about 3:4, and a molar ratio of a hydroxyl group of polyvinyl alcohol and lithium of lithium salt was changed to about 1:0.31 in a composition for forming an ion conductive oxygen-blocking film.

Example 3

Preparation of an Ion Conductive Oxygen-Blocking Film

An ion conductive oxygen-blocking film was prepared by performing the same preparation method as in Example 1 except that a weight ratio of polyvinyl alcohol and lithium salt was changed to about 3:2, and a molar ratio of a hydroxyl group of polyvinyl alcohol and lithium of lithium salt was changed to about 1:0.16 in a composition for forming an ion conductive oxygen-blocking film.

Example 4

Preparation of an Ion Conductive Oxygen-Blocking Film

An ion conductive oxygen-blocking film was prepared by performing the same preparation method as in Example 1 except that a weight ratio of polyvinyl alcohol and lithium salt was changed to about 3:1, and a molar ratio of a hydroxyl group of polyvinyl alcohol and lithium of lithium salt was changed to about 1:0.078 in a composition for forming an ion conductive oxygen-blocking film.

Example 5

Preparation of an Ion Conductive Oxygen-Blocking Film

An ion conductive oxygen-blocking film was prepared by performing the same preparation method as in Example 1 except that 5% by weight/volume of a polyvinyl alcohol blend solution instead of 5% by weight/volume of a polyvinyl alcohol solution was used, based on the total volume of the solution.

The about 5% by weight/volume of the polyvinyl alcohol blend solution was obtained by dissolving polyvinyl alcohol having a weight average molecular weight of about 93500 Daltons and a degree of saponification of about 99 mol % and polymethyl methacrylate in DMSO at a mixing weight ratio of about 1:0.01 and then stirring the resultant at about 60° C. for about 5 hours.

Example 6

Preparation of an Ion Conductive Oxygen-Blocking Film

An ion conductive oxygen-blocking film was prepared by performing the same preparation method as in Example 1 except that a weight ratio of polyvinyl alcohol and polymethyl methacrylate was changed to about 1:1 when preparing a polyvinyl alcohol blend solution.

Example 7

Preparation of an Ion Conductive Oxygen-Blocking Film

An ion conductive oxygen-blocking film was prepared by performing the same preparation method as in Example 1 except that the degree of saponification of polyvinyl alcohol was changed to about 85 mol %.

Example 8

Preparation of an Ion Conductive Oxygen-Blocking Film

An ion conductive oxygen-blocking film was prepared by performing the same preparation method as in Example 1 except that the weight average molecular weight of polyvinyl alcohol was changed to about 30,000 Daltons.

Example 9

Preparation of an Ion Conductive Oxygen-Blocking Film

An ion conductive oxygen-blocking film was prepared by performing the same preparation method as in Example 1 except that thickness of the ion conductive oxygen-blocking film was changed to about 5 μm.

Example 10

Preparation of an Ion Conductive Oxygen-Blocking Film

An ion conductive oxygen-blocking film was prepared by performing the same preparation method as in Example 5 except that polyacrylonitrile instead of polymethyl methacrylate was used when preparing a polyvinyl alcohol blend solution.

Examples 11

Manufacturing of a Lithium Air Battery

Multi-walled carbon nanotubes (MWCNTs) and N,N-diethyl-methylamine trifluoromethanesulfonate (DEMA) as an ionic liquid were mixed at a weight ratio of about 1:5 to prepare a mixture, and then, a polytetrafluoroethylene (PTFE) binder was added to the mixture to prepare a positive electrode composition at about 25° C. and the positive electrode composition was coated and dried on the surface of a current collector to obtain a positive electrode. Here, in the positive electrode composition, MWCNTs, DEMA, and PTFE were mixed at a weight ratio of about 1:5:0.5.

A lithium metal was adhered to a copper thin film as a negative electrode current collector to prepare a lithium negative electrode having a thickness of about 100 μm.

Figure 2:
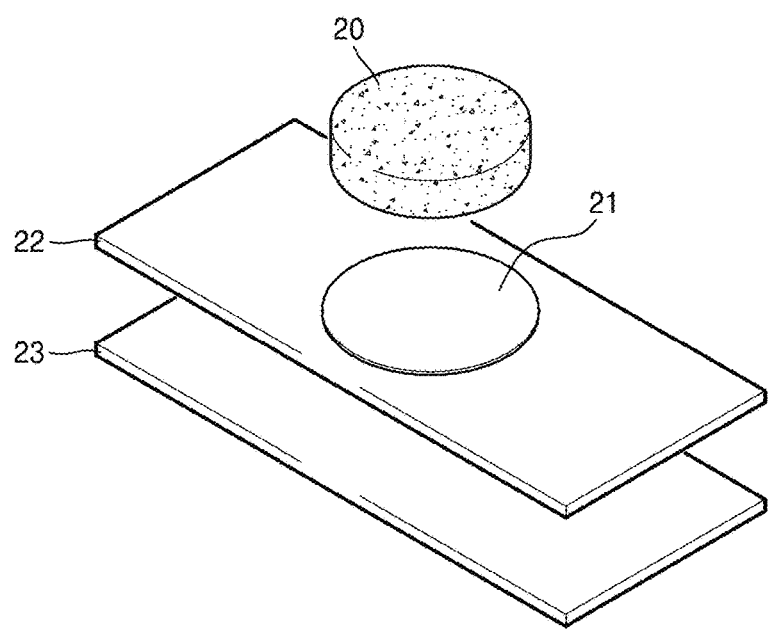
FIG. 2 is a schematic drawing showing the structure of a lithium air battery manufactured according to Example 11.

An ion conductive oxygen-blocking film 22 obtained according to Example 1 was interposed between one side of the positive electrode 21 and the lithium negative electrode 23. After a carbon paper (35 BA available from SGL 20) as a gas diffusion layer was placed on the other side of the positive electrode 21, an Ni mesh as a current collector was sequentially disposed on the carbon paper as the gas diffusion layer, and a pressing member was pressed on the Ni mesh as the current collector to fix a cell, thereby manufacturing a lithium air battery as shown in FIG. 2.

Examples 12-20

Manufacturing of Lithium Air Batteries

Lithium air batteries were manufactured by performing the same manufacturing method as in Example 11 except that ion conductive oxygen-blocking films obtained according to Examples 2 to 10 instead of the ion conductive oxygen-blocking film obtained according to Example 1 were used.

Example 21

Manufacturing of a Lithium Air Battery

An ion conductive oxygen-blocking film was prepared by performing the same preparation method as in Example 1 except that the process of drying in a vacuum oven of about 60° C. for about 5 hours was omitted. Subsequently, a lithium air battery was manufactured using the ion conductive oxygen-blocking film by performing the same manufacturing method as in Example 11.

A water content was measured from the ion conductive oxygen-blocking film prepared according to Example 21 according to Karl-Fisher method, and the measurement result was about 500 ppm.

Comparative Example 1

Polyvinyl Alcohol Film

After dissolving polyvinyl alcohol having a weight average molecular weight of about 93500 Daltons and a degree of saponification of about 99 mol % into DMSO, the dissolved solution was stirred at about 60° C. for about 7 hours to obtain about 5% by weight/volume of a polyvinyl alcohol solution, based on the total volume of the solution.

After casting the polyvinyl alcohol solution on a Petri dish, the polyvinyl alcohol solution cast on the Petri dish was dried at about 60° C. for about 24 hours. Subsequently, the resultant product was dried in a vacuum oven of about 60° C. for about 5 hours, and an ion conductive oxygen-blocking film containing polyvinyl alcohol was separated from the Petri dish. At this time, the polyvinyl alcohol film had a thickness of about 70 μm.

Comparative Example 2

Manufacturing of a Lithium Air Battery

A lithium air battery was manufactured by performing the same manufacturing method as in Example 11 except that the polyvinyl alcohol film obtained according to Comparative Example 1 instead of the ion conductive oxygen-blocking film obtained according to Example 1 was used.

Comparative Example 3

Preparation of a Polyethylene Oxide (PEO) Film

About 1.38 g of polyethylene oxide powder having a weight average molecular weight of about 600,000 Daltons (available from Aldrich Corporation) and about 0.9 g of $Li(CF_3SO_2)_2N$ (LiTFSI) (available from Wako Corporation) were dispersed into about 100 mL of acetonitrile (AN) to prepare a mixture, and the mixture was stirred for about 24 hours to prepare a composition for forming an electrolyte.

The composition for forming the electrolyte was cast on a Teflon dish and the resultant was dried at about 25° C. for about 24 hours to remove an acetonitrile solvent, the resultant product was dried in a vacuum atmosphere of about 60° C. for about 12 hours to obtain $PEO_{10}LiTFSI$ film (hereinafter, referred to as "PEO film") as an electrolyte. In the polymeric PEO film, ethylene oxide (EO) and lithium had a molar ratio of about 20:1.

Comparative Example 4

Manufacturing of a Lithium Air Battery

A lithium air battery was manufactured by performing the same manufacturing method as in Example 11 except that the PEO film obtained according to Comparative Example 3 instead of the ion conductive oxygen-blocking film obtained according to Example 1 was used.

Comparative Example 5

Manufacturing of a Lithium Air Battery

An ion conductive oxygen-blocking film was prepared by performing the same preparation method as in Example 1 except that lithium bis(oxalate)borate (LiBOB) instead of lithium bis(fluorosulfonyl)imide (LiFSI) was used when preparing a composition for forming the ion conductive oxygen-blocking film. Subsequently, a lithium air battery was manufactured using the ion conductive oxygen-blocking film by performing the same manufacturing method as in Example 11.

Evaluation Example 1

XRD Analyses

The ion conductive oxygen-blocking films prepared according to Examples 1 to 4, and the polyvinyl alcohol film prepared according to Comparative Example 1 were analyzed by X-ray diffraction (XRD) analysis using a CuK-alpha X-ray having a wavelength of about 1.541 Å. The XRD analyses were performed by using a diffractometer+ Rigaku RINT2200HF using Cuα Karadiation (1.540598 Å) as an XRD analyzer.

Figure 3A:
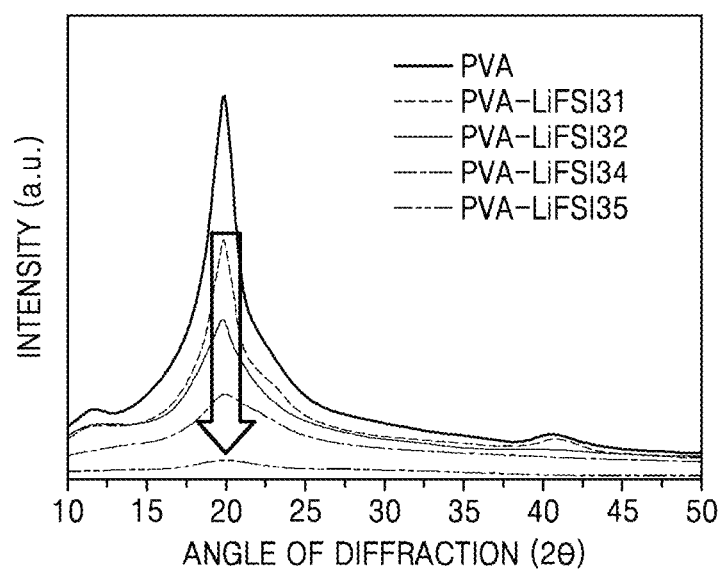
FIG. 3A is a graph of intensity (arbitrary units, a.u.) versus angle of diffraction ($2\theta$) and shows X-ray diffraction (XRD) analysis results of ion conductive oxygen-blocking films prepared according to Examples 1 to 4 and a polyvinyl alcohol film prepared according to Comparative Example 1.

XRD analysis results of the ion conductive oxygen-blocking films prepared according to Examples 1 to 4, and the polyvinyl alcohol film prepared according to Comparative Example 1 were respectively represented in FIG. 3A. Half-widths of main peaks having 2θ of about 15° to about 25° were represented in the following Table 1.

In FIG. 3A, PVA-LiFSI35, PVA-LiFSI34, PVA-LiFSI32, PVA-LiFSI31, and PVA respectively represent diffraction angles 2θ for Examples 1 to 4, and Comparative Example 1.

TABLE 1

| Classification | Full width at half maximum (FWHM) (°) |
| --- | --- |
| Example 1 | 7 |
| Example 2 | 7 |
| Example 3 | 5 |
| Example 4 | 3 |
| Comparative Example 1 (polyvinyl alcohol film) | 2 |

Referring to Table 1, the polyvinyl alcohol film of Comparative Example 1 is a film having a high crystallinity. On the other hand, the ion conductive oxygen-blocking films prepared according to Examples 1 to 4 have increased FWHM of a main peak compared to the polyvinyl alcohol film of Comparative Example 1. The more the content of a lithium salt increases, the far more the FWHM of the main peak is increased in the ion conductive oxygen-blocking films prepared according to Examples 1 to 4 compared to the polyvinyl alcohol film of Comparative Example. It can be seen from this that, when the lithium salt is added to the ion conductive oxygen-blocking films, the crystal structure of polyvinyl alcohol is changed to have a crystal structure with an amorphous phase. The more the content of the lithium salt increases, the more amorphous crystal structure polyvinyl alcohol composing the ion conductive oxygen-blocking films has. If polyvinyl alcohol of the ion conductive oxygen-blocking films has the amorphous crystal structure, there are advantages that, as —OH groups of the polyvinyl alcohol provide oxygen-blocking properties, a crystalline area and an amorphous area are present in the ion conductive oxygen-blocking films, and transfer of lithium ions is facilitated through the amorphous area such that ion conductivity of the ion conductive oxygen-blocking films may be increased.

Evaluation Example 2

SEM

The ion conductive oxygen-blocking film prepared according to Example 1 and a polyvinyl alcohol film obtained according to Comparative Example 1 were analyzed by SEM. An SEM analyzer S-4700 manufactured by Hitachi Corporation was used. The SEM images of the ion conductive oxygen-blocking film prepared according to Example 1 and a polyvinyl alcohol film obtained according to Comparative Example 1 are shown in FIGS. 3B and 3C, respectively.

Figure 3B:
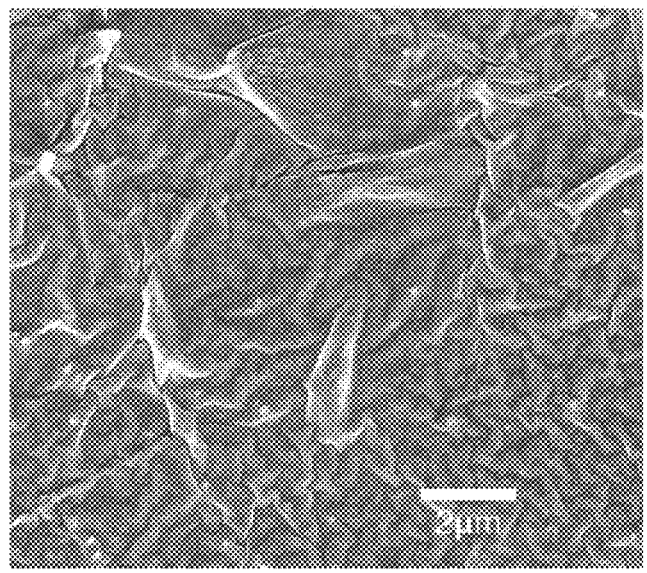
FIGS. 3B and 3C respectively represent scanning electron microscope (SEM) analysis results for an ion conductive oxygen-blocking film prepared according to Example 1 and a polyvinyl alcohol film obtained according to Comparative Example 1.
Figure 3C:
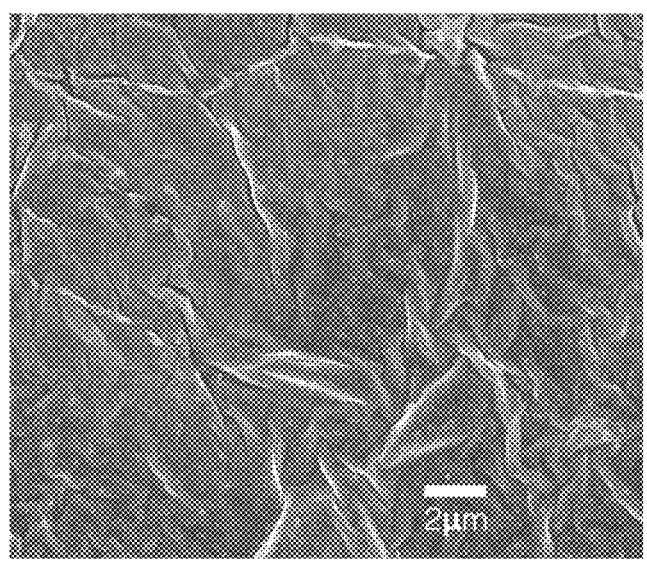

Referring to FIGS. 3B and 3C, the polyvinyl alcohol film prepared according to Comparative Example 1 represents a structure having a high crystallinity as shown in FIG. 3C. On the contrary, it can be seen that, as shown in FIG. 3B, an amorphous area is formed, and the crystal area along with the amorphous area exist in the ion conductive oxygen-blocking film prepared according to Example 1. If the amorphous area exists in the ion conductive oxygen-blocking film as described above, ion conductivity of the ion conductive oxygen-blocking film is further improved.

Evaluation Example 3

Oxygen Transmission Rate (OTR)/Ion Conductivity Tests

1) Examples 1 to 4, and Comparative Example 1

OTR/ion conductivity test analyses were performed on the ion conductive oxygen-blocking films prepared according to Examples 1 to 4 and the polyvinyl alcohol film obtained according to Comparative Example 1 as follows.

Figure 4:
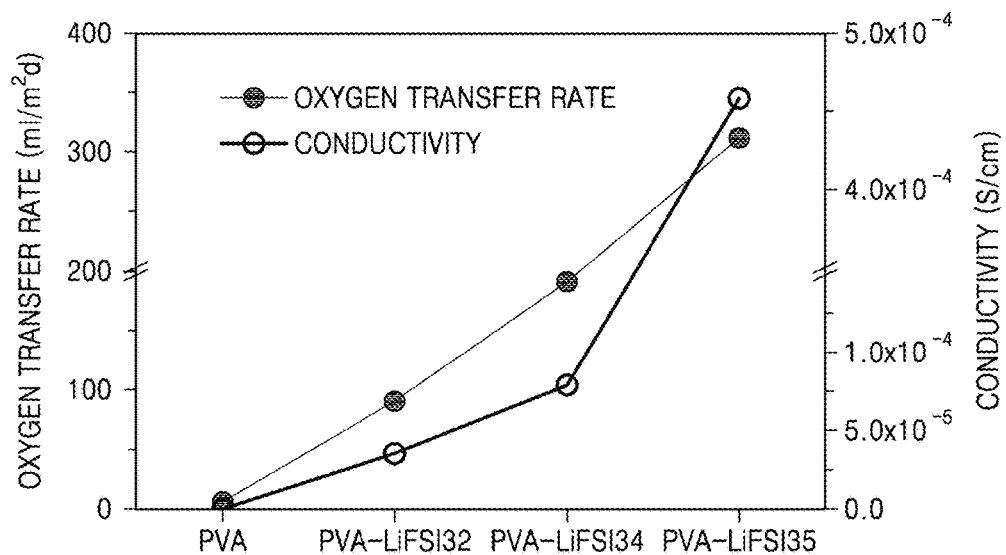
FIG. 4 is a graph of oxygen transfer rate (OTR) (milliliters per square meter per day, mL/m$^2$d) and conductivity (Siemens per centimeter, S/cm) for various film types and shows the results of oxygen transmission rate (OTR)/conductivity analysis for ion conductive oxygen-blocking films prepared according to Examples 1 to 4 and a polyvinyl alcohol film obtained according to Comparative Example 1.

OTR values were measured by performing oxygen transmission tests on sample discs having an area of about 1 $cm^2$ at about 25° C. using an oxygen transmission rate tester OX-TRAN 2/21 ML (manufactured by MOCON Corporation), and the OTR results were shown in FIG. 4.

Ion conductivities were evaluated by measuring resistance values while applying a voltage bias of about 10 mV to the ion conductive oxygen-blocking films at about 25° C. in a frequency range of about 1 Hertz (Hz) to about 1 megaHertz (MHz) and scanning temperatures of the ion conductive oxygen-blocking films, and the evaluation results were shown in FIG. 4.

Referring to FIG. 4, changes in OTR and ion conductivities can be determined from the ion conductive oxygen-blocking films containing various concentrations of LiFSI in PVA. The ion conductive oxygen-blocking films prepared according to Examples 1 to 4 represented oxygen transmission rates by having OTR of about 350 $mL/m^2 d$ or less.

2) Examples 1 and 21, and Comparative Example 5

OTR analyses were performed on the ion conductive oxygen-blocking films prepared according to Examples 1 and 21, and Comparative Example 5, and analysis results are shown in the following Table 2:

TABLE 2

| Classification | OTR ($mL/m^2$ day) |
| --- | --- |
| Example 1 | 152 |
| Example 21 | 1200 |
| Comparative Example 5 | Unmeasurable (>10,000) |

As shown in Table 2, it was substantially difficult to measure OTR values from the ion conductive oxygen-blocking film since an OTR value of the ion conductive oxygen-blocking film prepared according to Comparative Example 5 exceeded a measurement limit value of about more than 10,000 $mL/m^2$ day of an OTR analysis instrument. On the contrary, it can be seen that the OTR value was remarkably decreased such that oxygen-blocking properties were much improved in the ion conductive oxygen-blocking film prepared according to Example 1 compared to the ion conductive oxygen-blocking film prepared according to Comparative Example 5. Further, the ion conductive oxygen-blocking film prepared according to Example 21 represented an improved oxygen transmission rate compared to the ion conductive oxygen-blocking film prepared according to Example 1 having a low water content. It can be seen from this that the water content of the ion conductive oxygen-blocking film had an important influence on the oxygen transmission rate.

Evaluation Example 4

Impedance Measurement

The ion conductive oxygen-blocking film prepared according to Example 1 was laminated on a lithium negative electrode, and the ion conductive oxygen-blocking film laminated on the lithium negative electrode was bonded to a lithium counter electrode to manufacture an Li/Li symmetric cell.

An impedance measurement process was performed on the lithium air battery (full cell) manufactured according to Example 11 and the symmetric cell at about 25° C. according to a 2-probe method by using an impedance/gain-phase analyzer Solartron 1260A. An amplitude range and a frequency range were about ±10 mV and about 0.1 Hz to about 1 MHz respectively.

Figure 5:
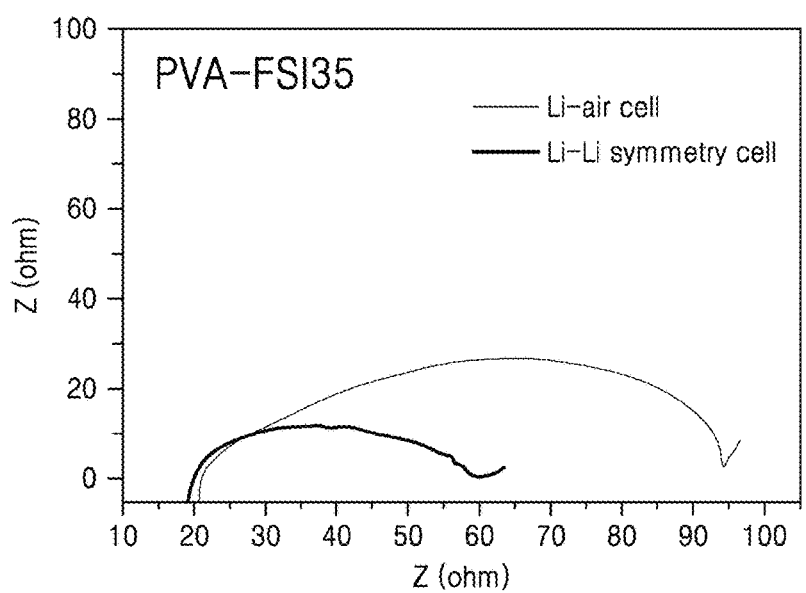
FIG. 5 is a graph of imaginary resistance ($Z_2$, ohms) versus real resistance ($Z_1$, ohms) and is a Nyquist plot showing the results of impedance measurement after manufacturing a lithium air battery and an Li/Li symmetric cell manufactured using a negative electrode prepared according to Example 1.

After manufacturing the above-described lithium air battery and symmetric cell, a Nyquist plot for the measurement results was shown in FIG. 5. In FIG. 5, an interfacial resistance $R_{inf}$ of the electrode and the electrolyte is dependent from the positions and sizes of the semicircles. As shown in FIG. 5, it can be seen that an interfacial resistance increase was relieved, and an interfacial resistance was about 100Ω lapse of time in the Li—Li symmetric cell and lithium air battery (full cell). It can be seen from this that interfacial stabilization performance of the lithium negative electrode and the ion conductive oxygen-blocking film was improved in the lithium air battery manufactured according to Example 11.

Evaluation Example 5

DMA

1) Example 1

Figure 6A:
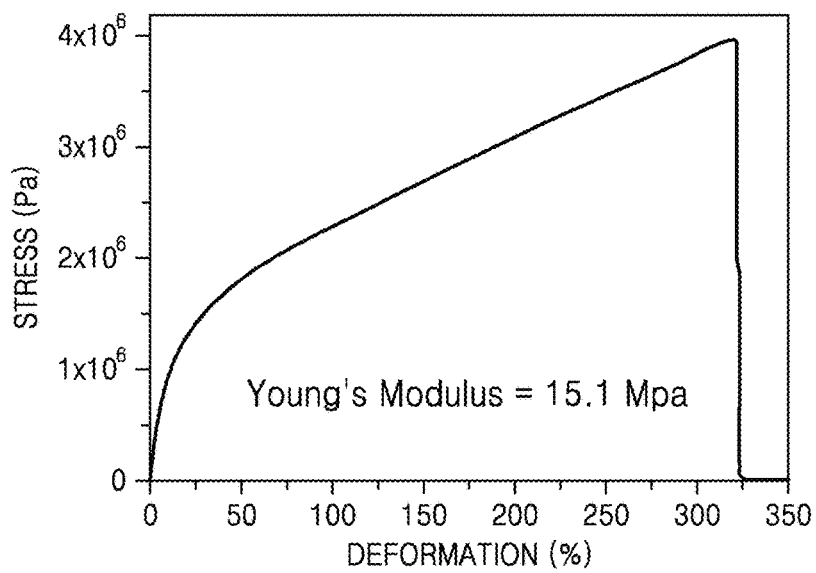
FIG. 6A is a graph of stress (Pascals, Pa) versus deformation (percent, %) showing the results of dynamic mechanical analysis (DMA) for an ion conductive oxygen-blocking film prepared according to Example 1.

DMA was performed on the ion conductive oxygen-blocking film prepared according to Example 1, and analysis results are as shown in FIG. 6A.

As shown in FIG. 6A, it can be seen that the ion conductive oxygen-blocking film prepared according to Example 1 was improved in mechanical strength by maintaining an improved tensile modulus of about 15.1 MPa and a ductility of about 300% or higher.

2) Examples 1 to 4 and Comparative Example 1

Figure 6B:
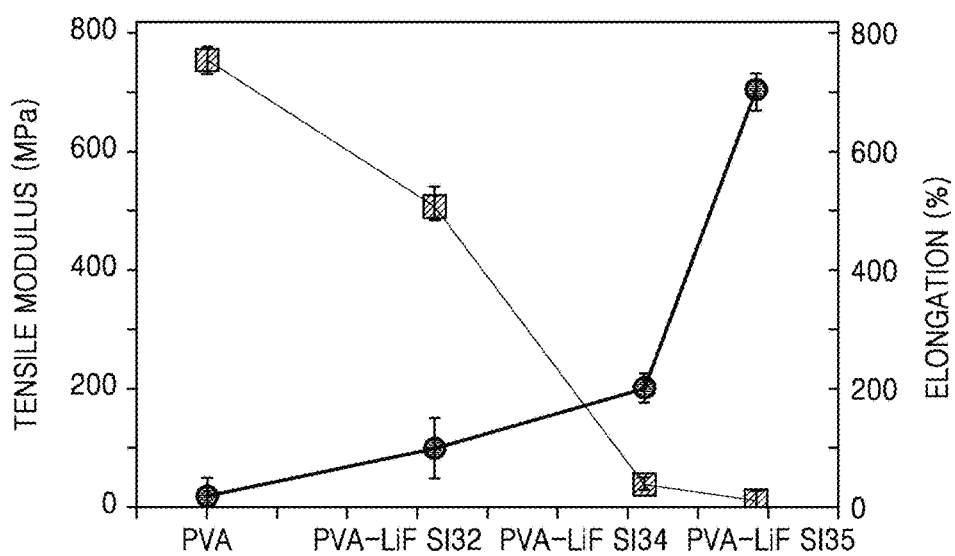
FIG. 6B is a graph of tensile modulus (megaPascals, MPa) and elongation (percent, %) for various film types and shows DMA results for ion conductive oxygen-blocking films prepared according to Examples 1 to 4 and a polyvinyl alcohol film obtained according to Comparative Example 1.

FIG. 6B represents DMA results for the ion conductive oxygen-blocking films prepared according to Examples 1 to 4 and the polyvinyl alcohol film obtained according to Comparative Example 1.

Referring to FIG. 6B, it can be seen that ductilities of the ion conductive oxygen-blocking films were further increased although tensile modulus values of the ion conductive oxygen-blocking films were decreased when lithium salts were increased.

Evaluation Example 6

Dimensional Stability Test

After dipping the ion conductive oxygen-blocking film prepared according to Example 1 into DEMA and polyethylene glycol dimethyl ether (PEGDME) respectively for about 10 minutes, a weight change of the ion conductive oxygen-blocking film according to passage of time was measured such that dimensional stability of the ion conductive oxygen-blocking film was evaluated.

Figure 7:
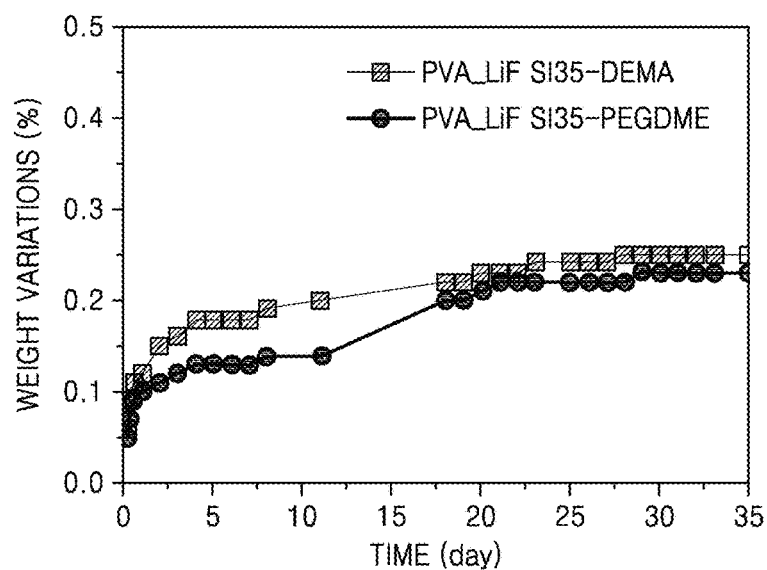
FIG. 7 is a graph of weight variation (percent, %) versus time (days) and shows the results of dimensional stability tests of an ion conductive oxygen-blocking film prepared according to Example 1.

Dimensional stability evaluation results are as shown in FIG. 7.

Referring to FIG. 7, the ion conductive oxygen-blocking film had a slight weight variation of about 0.3% or less in spite of the passage of time. It can be seen from such results that DEMA and PEGDME penetrated into the ion conductive oxygen-blocking film in a very small amount.

Evaluation Example 7

Evaluation of Symmetric Cells' Activities

After laminating the ion conductive oxygen-blocking film prepared according to Example 1 and the PEO film prepared according to Comparative Example 3 on the top of a lithium negative electrode, the ion conductive oxygen-blocking film and the PEO film laminated on the lithium negative electrode were respectively bonded to a lithium counter electrode to manufacture coin cell type Li/Li symmetric cells A and B respectively.

A constant current was applied to the symmetric cells A and B with changing periodically the polarity of the lithium negative electrode. A constant current charging process was performed on the symmetric cells A and B at about 60° C. during and at a capacitance of about 0.2 mAh/cm², about 0.3 mAh/cm², or about 1.0 mAh/cm² during 1 hour.

A constant current discharging process was performed on the symmetric cells A and B at about 60° C. and at a capacitance of about 0.2 mAh/cm², about 0.3 mAh/cm², or about 1.0 mAh/cm² during 1 hour. The above-described charging and discharging processes were repeatedly performed on the symmetric cells A and B that had passed through the constant current discharging process, and results of the charging and discharging processes are shown in FIGS. 8A and 8B.

Figure 8A:
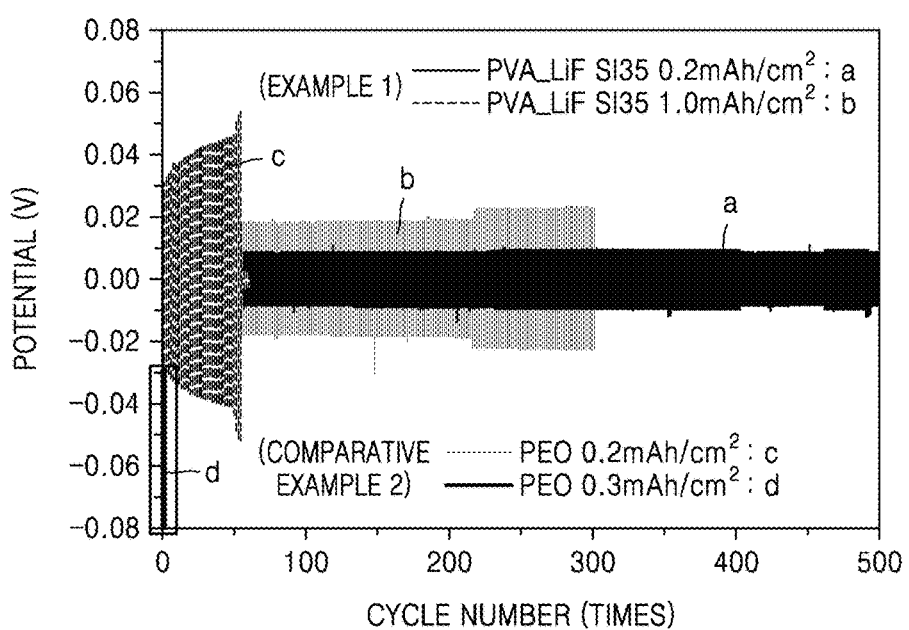
FIGS. 8A and 8B are graphs of potential (volts, V) versus cycle number (times) and shows the results of testing to evaluate the cyclability of Li/Li symmetric cells manufactured using an ion conductive oxygen-blocking film prepared according to Example 1 and a polyethylene oxide (PEO) film prepared according to Comparative Example 3.

It can be seen that the symmetric cell A represented performance of about 500 cycles or more as represented by a of FIG. 8A while the symmetric cell B realized performance of about 300 cycles at a capacitance of about 0.2 mAh/cm² as represented by c of FIG. 8A.

It can be seen that the symmetric cell A realized performance of about 60 cycles or more at a capacitance of about 1.0 mAh/cm² as represented by b of FIG. 8A while the symmetric cell B showed a battery activity of about 1 cycle or less at a capacitance of about 0.3 mAh/cm² as represented by d of FIG. 8A. It can be seen from this that the symmetric cell A was improved in relative stability on a lithium metal compared to the symmetric cell B.

Figure 8B:
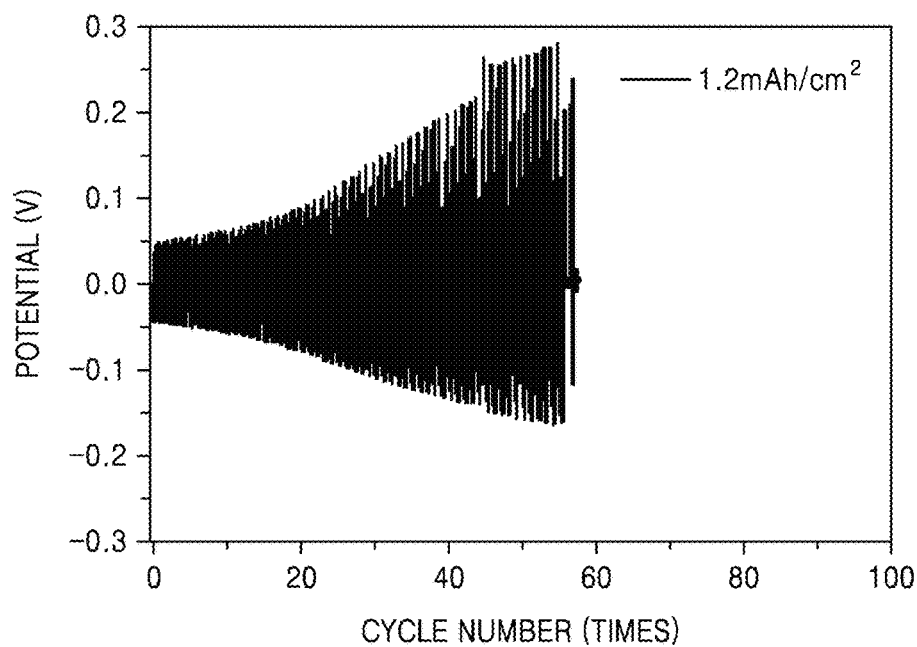

FIG. 8B represents cycle characteristics for the symmetric cell A at a capacitance of about 1.2 mAh/cm². Referring to FIG. 8B, it can be seen that the symmetric cell A realized performance of less than 60 cycles at a capacitance of about 1.2 mAh/cm².

On the contrary, it can be seen that capacity characteristics were lowered in a lithium symmetric cell manufactured using the PEO film prepared according to Comparative Example 3 compared to a symmetric cell manufactured using the ion conductive oxygen-blocking film prepared according to Example 1.

Evaluation Example 8

Activities of Lithium Air Batteries

1) Example 11

The lithium air battery of Example 11 was discharged in an oxygen atmosphere of 1 atm at 60° C., at a constant current of 0.24 mA/cm$^2$ to 2.1V (with respect to Li), and then charged at a constant current to 4.55V, and then at a constant voltage of 4.55V to a current of 0.02 mA/cm$^2$.

Figure 9A:
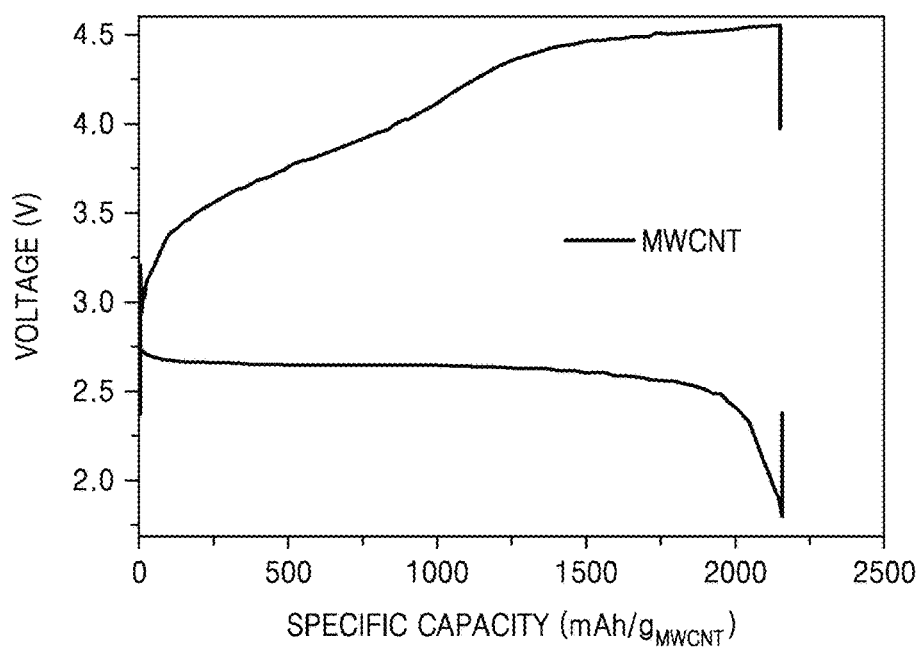
FIGS. 9A and 9D are graphs of voltage (volts, V) versus specific capacity (milliAmpere-hours per gram of multi-wall carbon nanotubes, mAh/$g_{MWCNT}$) and respectively show voltage changes according to specific capacity after repeating the charge/discharge cycle in lithium air batteries manufactured according to Example 11 and Comparative Example 5.
Figure 9B:
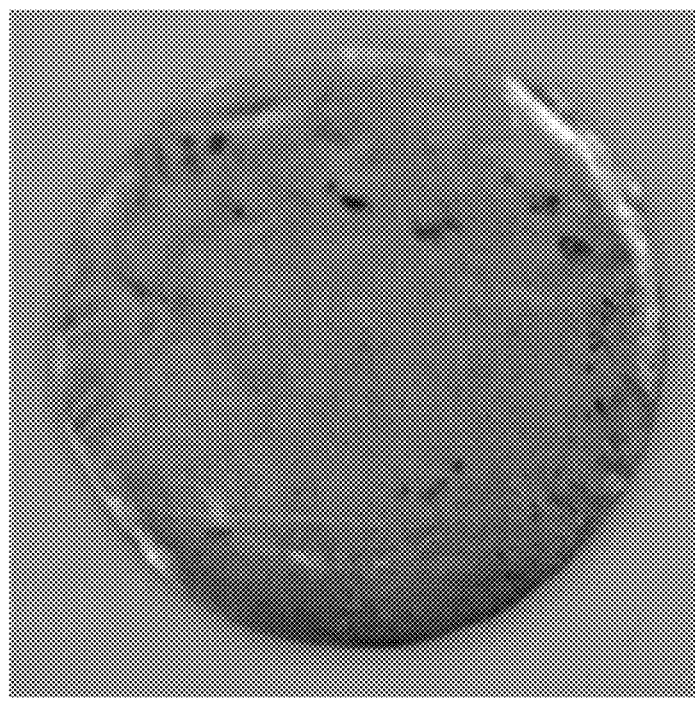
FIGS. 9B and 9C are optical microscopic images for the surface of a lithium negative electrode after performing charging and discharging processes in a lithium air battery manufactured according to Example 11.
Figure 9C:
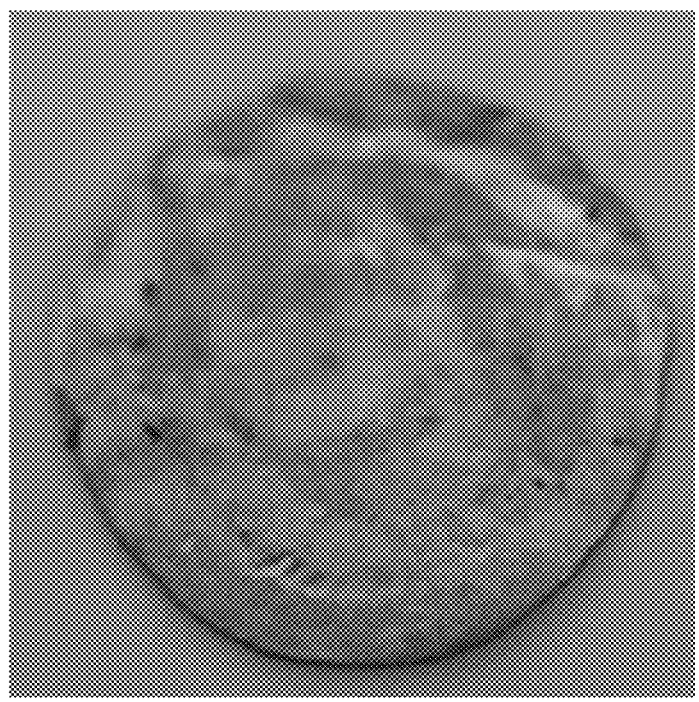

After repeating charge/discharge cycles of the lithium air battery, voltage variations according to capacitances were examined and are shown in FIG. 9A. Optical microscopic images for the surface of a lithium negative electrode of the lithium air battery after performing the charging and discharging processes are shown in FIGS. 9B and 9C respectively.

Referring to FIG. 9A, it can be seen that a positive electrode of the lithium air battery manufactured according to Example 11 provided a specific capacity of about 1500 mAh/g to about 3000 mAh/g. It can be seen from this result that an ion conductive oxygen-blocking film represented stability in the specific capacity realization of the above-described positive electrode during the charging and discharging processes. It can be seen that such a lithium air battery manufactured according to Example 11 provided stable charge/discharge characteristics. Further, referring to FIGS. 9B and 9C, the surface of the lithium negative electrode was clean after performing the charging and discharging processes. It can be seen that the ion conductive oxygen-blocking film did not react with the surface of the lithium negative electrode even after the charging and discharging processes.

2) Comparative Example 5

Activity of the lithium air battery manufactured according to Comparative Example 5 was evaluated by the same method as the lithium air battery manufactured according to Example 11.

Figure 9D:
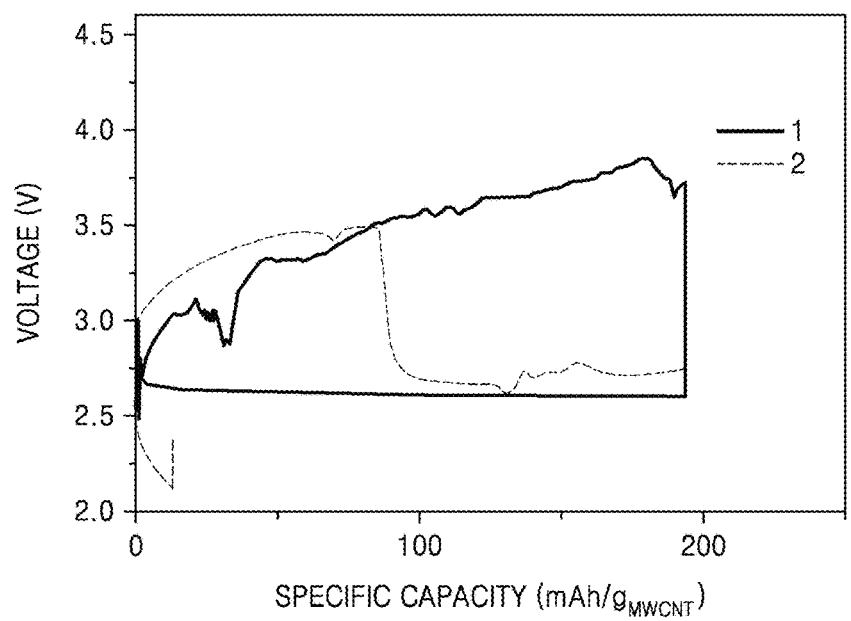

The evaluation results are as shown in FIG. 9D.

Referring to FIG. 9D, it can be seen that the lithium air battery manufactured according to Comparative Example 5 was not charged after the discharging process due to unstable characteristics.

Evaluation Example 9

Cyclability, Energy Density, and Energy Efficiency of Lithium Air Batteries

The lithium air batteries of Example 11 and Comparative Example 4 were discharged in an oxygen atmosphere of 1 atm at 60° C., at a constant current of 0.24 mA/cm$^2$ to 2.1V (with respect to Li), and then charged at a constant current to 4.55V, and then at a constant voltage of 4.55V to a current of 0.02 mA/cm$^2$.

Cycle characteristics, energy densities, and energy efficiencies were all examined by performing the charge/discharge cycles of the lithium air batteries.

Figure 10A:
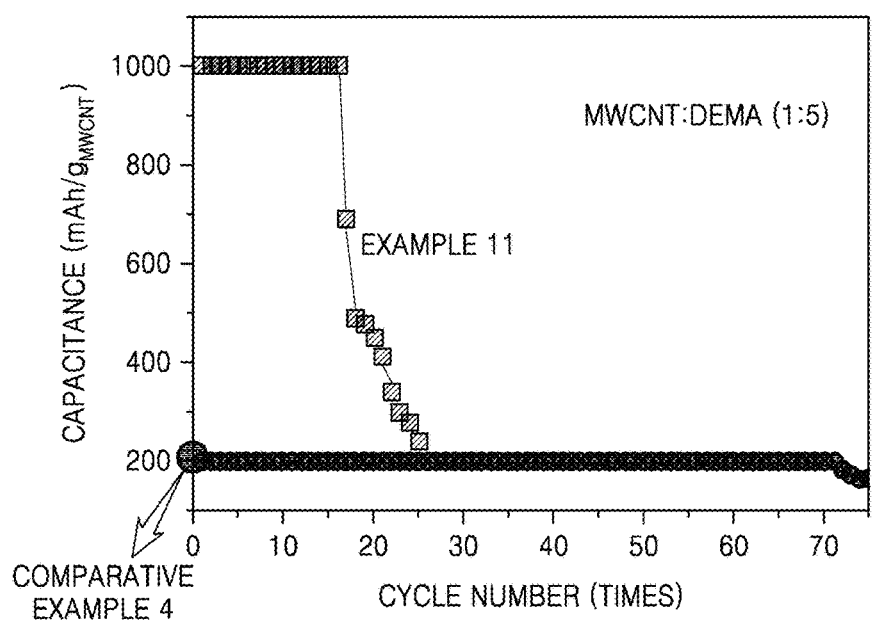
FIG. 10A is a graph of capacitance (milliAmpere-hours per gram of multi-walled carbon nanotubes, $mAh/g_{MWCNT}$) versus cycle number (times) which shows changes in cyclability of lithium air batteries manufactured according to Example 11 and Comparative Example 4.

Changes in the cyclabilities for the lithium air batteries manufactured according to Example 11 and Comparative Example 5 were shown in FIG. 10A. A surface image of the lithium metal after performing about 70 cycles or more of the charging and discharging process in the lithium air battery manufactured according to Example 11 was shown in FIG. 10B. A surface image of the ion conductive oxygen-blocking film after performing about 70 cycles or more of the charging and discharging process in the lithium air battery manufactured according to Example 1 was shown in FIG. 10C.

Figure 10B:
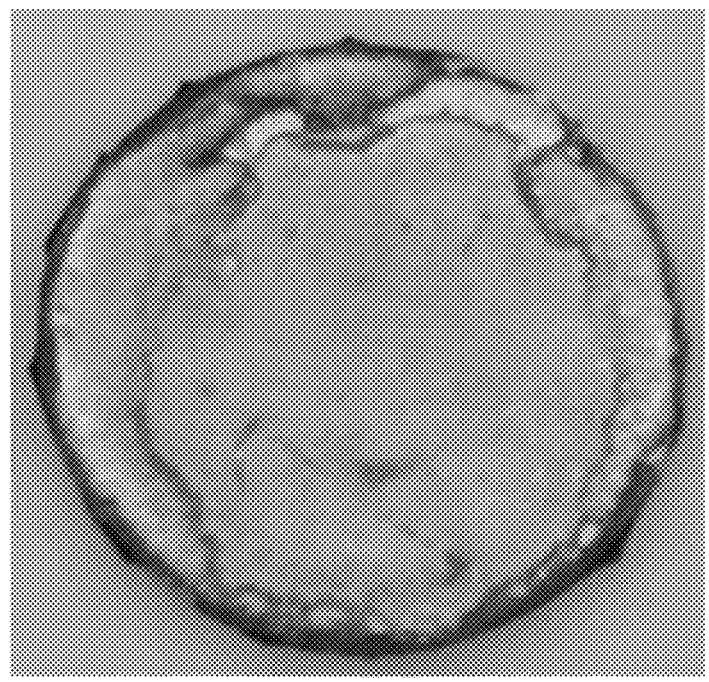
FIG. 10B is an optical microscopic image representing the surface of lithium metal after performing about 70 cycles or more of the charging and discharging process in a lithium air battery manufactured according to Example 1.
Figure 10C:
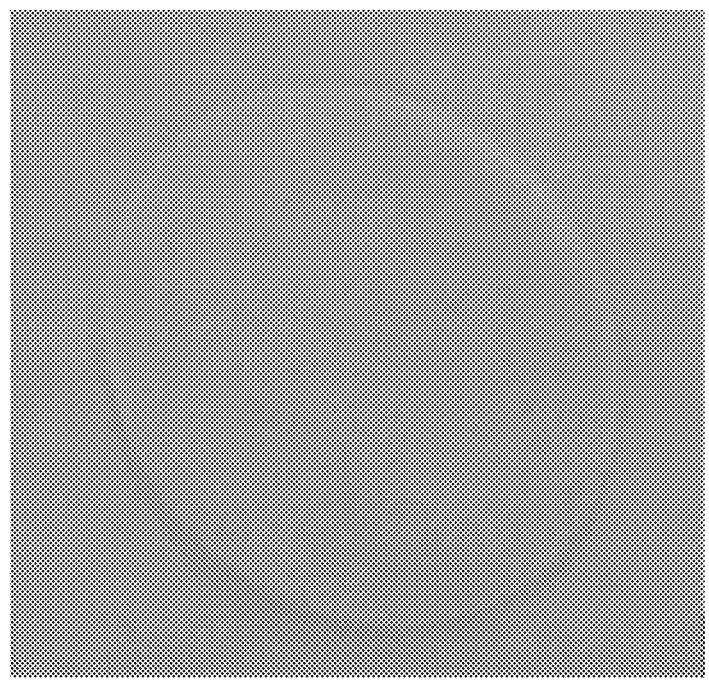
FIG. 10C is an optical microscope image of the surface of an ion conductive oxygen-blocking film after performing about 70 cycles or more of the charging and discharging process in a lithium air battery manufactured according to Example 1.
Figure 10D:
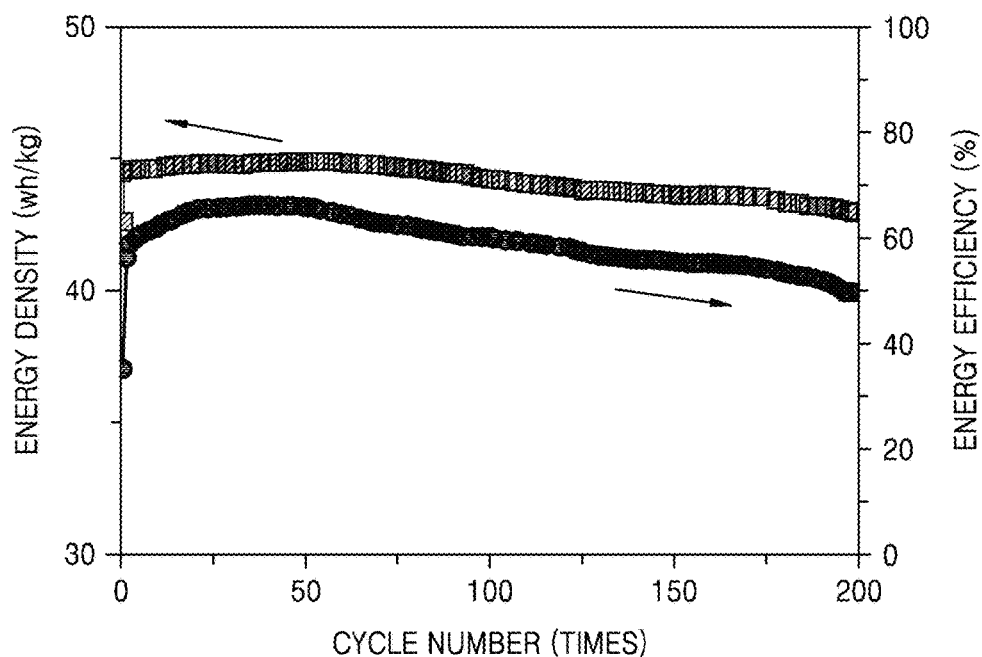
FIGS. 10D and 10E are graphs of energy density (Watt-hours per kilogram, Wh/kg) and energy efficiency (percent, %) after performing the charging and discharging process in a lithium air battery manufactured according to Example 11.
Figure 10E:
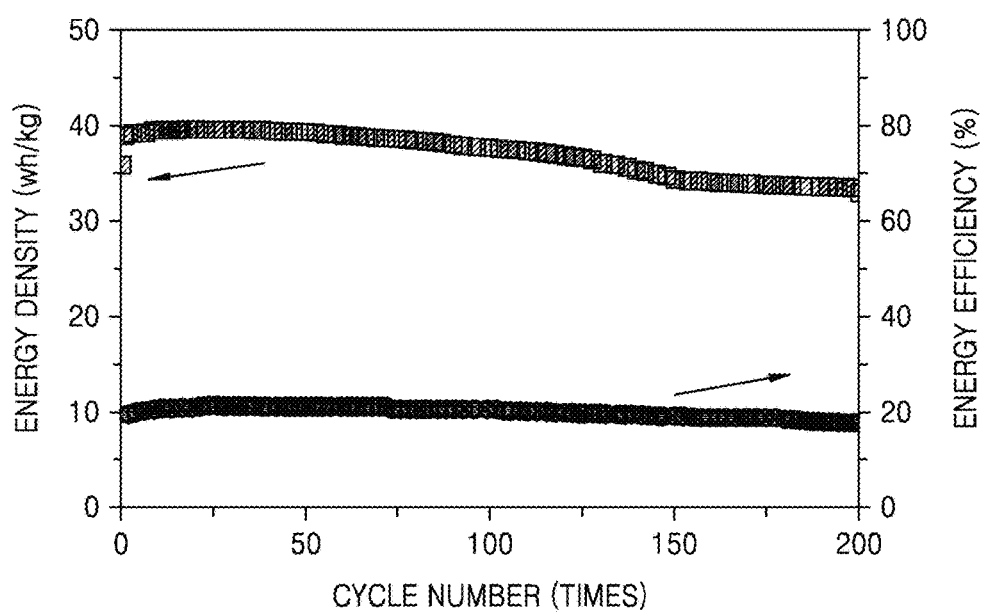

Energy densities and energy efficiencies after performing the charging and discharging process in the lithium air battery manufactured according to Example 11 are shown in FIGS. 10D and 10E.

As shown by the evaluation results, it can be seen that a cycle characteristic of the lithium air batteries of Example 11 has improved compared with that of the lithium air batteries of Comparative Example 5 as shown in FIG. 10A. Also, a 200 charge/discharge cycle performance of about 37 Wh/kg or more in the lithium air batteries of Example 11 was provided as shown in FIG. 10D. A 200 charge/discharge cycle performance of about 10 Wh/kg or more in the lithium air batteries of Example 11 was realized as shown in FIG. 10E.

Referring to FIGS. 10B and 10C, it can be seen that the ion conductive oxygen-blocking film did not react with the surface of the lithium negative electrode even after the charging and discharging processes from the fact that surfaces of the lithium negative electrode and the ion conductive oxygen-blocking film passing through the charging and discharging processes were clean even after performing the charge/discharge cycle of the lithium air battery manufactured according to Example 11.

Evaluation Example 10

Charge/Discharge Profile and Average Voltage of a Lithium Air Battery

The lithium air battery of Example 11 was discharged in an oxygen atmosphere of 1 atm at 60° C., at a constant current of 0.24 mA/cm$^2$ to 2.1V (with respect to Li), and then charged at a constant current to 4.55V, and then at a constant voltage of 4.55V to a current of 0.02 mA/cm$^2$.

Figure 11:
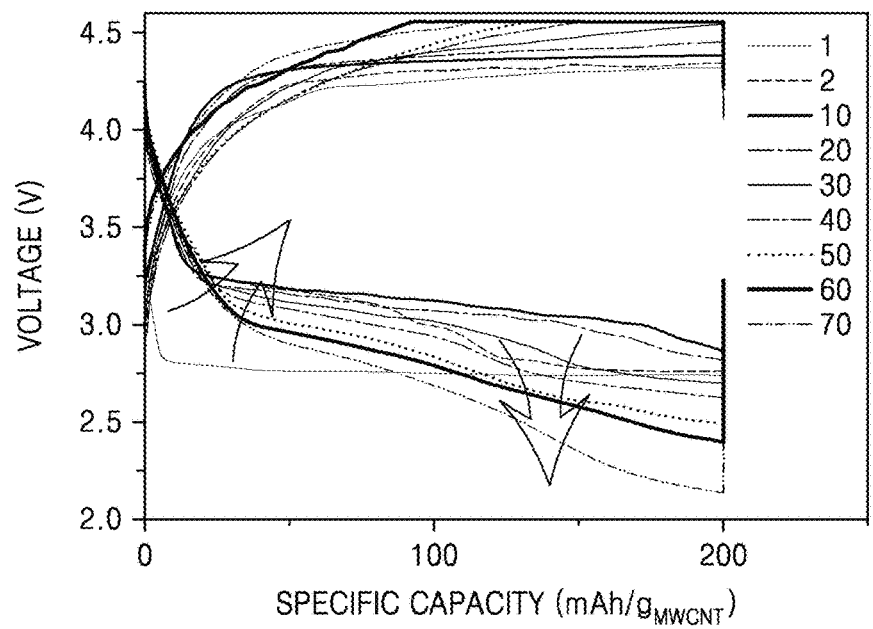
FIG. 11 is a graph of voltage (volts, V) versus specific capacity (milliAmpere-hours per gram of multi-walled carbon nanotubes, $mAh/g_{MWCNT}$) which shows discharge capacity changes for a lithium air battery manufactured according to Example 11.

After repeating charge/discharge cycles of the lithium air battery, voltage variations according to specific capacities of a positive electrode were examined and represented in FIG. 11. Average voltage variations were represented in FIG. 12.

Figure 12:
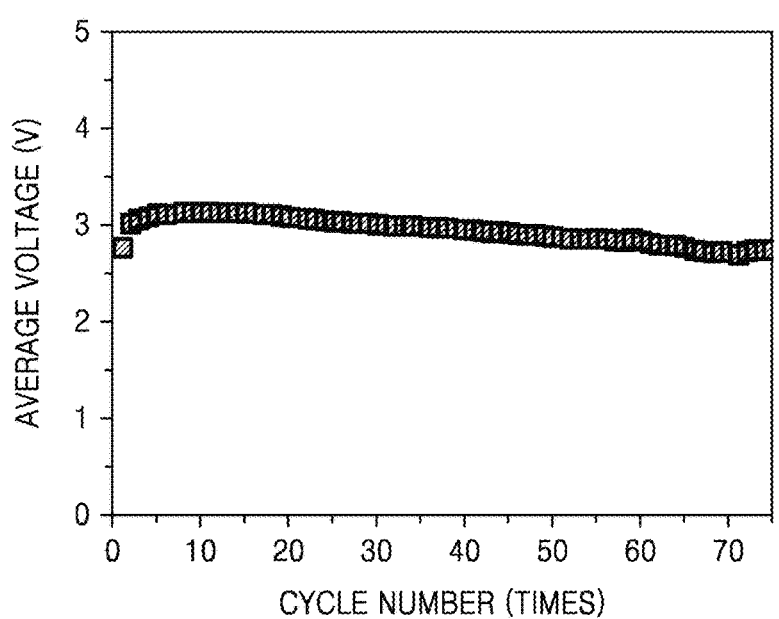
FIG. 12 is a graph of average voltage (volts, V) versus cycle number (times) which shows average voltage changes after repeating the charge/discharge cycle in a lithium air battery manufactured according to Example 11.

Referring to FIG. 11, it can be seen that the lithium air battery manufactured according to Example 11 realized charge/discharge cycle performance by protecting the lithium negative electrode, and had a high energy density through an improved weight at the same time. As shown in FIG. 12, it can be seen that the lithium air battery manufactured according to Example 11 had an average voltage of about 2.9 V.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A lithium air battery comprising:
a lithium negative electrode;
a positive electrode; and an ion conductive oxygen-blocking film which is disposed on the lithium negative electrode, wherein the ion conductive oxygen-blocking film comprises
  a first polymer comprising a polyvinyl alcohol or a polyvinyl alcohol blend, and
  a lithium salt, and
wherein the ion conductive oxygen-blocking film has an oxygen transmission rate of about 10 milliliters per square meter per day to about 10,000 milliliters per square meter per day.

2. The lithium air battery of claim 1, wherein the ion conductive oxygen-blocking film is disposed on greater than 0% to 100% or less of a surface of the lithium negative electrode.

3. The lithium air battery of claim 1, wherein the first polymer has a degree of saponification of about 85 mole percent or greater.

4. The lithium air battery of claim 1, wherein an amount of the lithium salt is in a range of about 50 parts by weight to about 200 parts by weight, based on 100 parts by weight of the first polymer.

5. The lithium air battery of claim 1, wherein the polyvinyl alcohol blend comprises
  a polyvinyl alcohol, and
  a second polymer comprising at least one selected from a poly(C1 to C12 alkyl)acrylate, a poly(C1 to C12 alkyl) methacrylate, polyacrylonitrile, and polymethacrylonitrile.

6. The lithium air battery of claim 5, wherein the second polymer comprises at least one selected from polymethyl methacrylate, polymethyl acrylate, polyethyl methacrylate, polyethyl acrylate, polypropyl methacrylate, polypropyl acrylate, polybutyl acrylate, polybutyl methacrylate, polypentyl methacrylate, polypentyl acrylate, polycyclohexyl methacrylate, polycyclohexyl acrylate, polyhexyl methacrylate, polyhexyl acrylate, polyglycidyl acrylate, polyglycidyl methacrylate, and polyacrylonitrile.

7. The lithium air battery of claim 5, wherein the amount of the second polymer is in a range of about 0.1 part by weight to about 100 parts by weight, based on 100 parts by weight of the polyvinyl alcohol.

8. The lithium air battery of claim 1, wherein the ion conductive oxygen-blocking film has a water content of about 300 parts per million or less.

9. The lithium air battery of claim 1, wherein the ion conductive oxygen-blocking film has an oxygen transmission rate of about 30 milliliters per square meter per day to about 4,000 milliliters per square meter per day.

10. The lithium air battery of claim 1, wherein the ion conductive oxygen-blocking film has an ion conductivity of about $1\times10^{-7}$ Siemens per centimeter or greater.

11. The lithium air battery of claim 1, wherein the lithium salt comprises at least one selected from $LiSCN$, $LiN(CN)_2$, $LiClO_4$, $LiBF_4$, $LiAsF_6$, $LiPF_6$, $LiCF_3SO_3$, $Li(CF_3SO_2)_2N$, $LiC(CF_3SO_2)_3$, $LiC(CF_3CF_2SO_2)_3$, $LiN(SO_2C_2F_5)_2$, $LiN(SO_2F)_2$, $LiN(CF_2SO_2)(CF_3CF_2CF_2CF_2SO_2)$, $LiPF_3(C_2F_5)_3$, $LiPF_3(CF_3)_3$, $LiF$, and $LiSbF_6$.

12. The lithium air battery of claim 1, wherein the lithium salt comprises a fluorine-containing sulfone compound selected from at least one of $LiN(CF_3SO_2)_2$, $LiN(SO_2F)_2$, $LiN(CF_2SO_2)(CF_3CF_2CF_2CF_2SO_2)$, $LiN(CF_3CF_2SO_2)_2$, $LiC(CF_3SO_2)_3$, and $LiC(CF_3CF_2SO_2)_3$.

13. The lithium air battery of claim 1, wherein the ion conductive oxygen-blocking film further comprises a nonconductive separator, and wherein the nonconductive separator supports the first polymer and the lithium salt.

14. The lithium air battery of claim 13, wherein the nonconductive separator comprises at least one selected from polyethylene, polypropylene, a vinyl polymer, a polyfluoroethylene, and polyimide.

15. The lithium air battery of claim 1, wherein the ion conductive oxygen-blocking film further comprises at least one selected from an ionic liquid, an inorganic particle, a polymeric ionic liquid, and an oligomer.

16. The lithium air battery of claim 15, wherein the inorganic particle comprises at least one selected from $Al_2O_3$, $SiO_2$, $BaTiO_3$, $TiO_2$, $SnO_2$, $Fe_2O_3$, $ZnO$, $CuO$, $MnO_2$, $Mn_2O_3$, a carbon nanotube, a cage-structured silsesquioxane, and a metal-organic framework.

17. The lithium air battery of claim 15, wherein the ionic liquid comprises at least one compound selected from
  at least one cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation; and
  at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$.

18. The lithium air battery of claim 15, wherein the oligomer comprises at least one selected from polyethylene glycol dimethyl ether and polyethylene glycol diethyl ether, and at least one oligomer selected from ethylene glycol, ethylene oxide, ethylene acetate, and ethylene imine.

19. The lithium air battery of claim 1, wherein the ion conductive oxygen-blocking film has a thickness of about 5 micrometers to about 250 micrometers.

20. The lithium air battery of claim 1, wherein the first polymer has a polymerization degree of about 100 to about 1000, and a weight average molecular weight of about 30,000 Daltons or greater.

21. The lithium air battery of claim 1, wherein the first polymer has a glass transition temperature of about 20° C. to about 100° C.

22. The lithium air battery of claim 1, further comprising a first electrolyte, which is disposed between the lithium negative electrode and the ion conductive oxygen-blocking film.

23. The lithium air battery of claim 22, wherein the first electrolyte comprises at least one selected from a liquid electrolyte, an inorganic electrolyte, a polymer electrolyte, and an organic/inorganic composite electrolyte.

24. The lithium air battery of claim 1, further comprising a second electrolyte, which is disposed between the ion conductive oxygen-blocking film and the positive electrode.

25. The lithium air battery of claim 24, wherein the second electrolyte is at least one selected from an ionic liquid, an inorganic electrolyte, a polymer electrolyte, and an organic/inorganic electrolyte.

26. The lithium air battery of claim 24, having an energy density of about 10 watt-hours per kilogram or greater.

27. The lithium air battery of claim 1, wherein the positive electrode comprises at least one selected from an ionic liquid and a polymer electrolyte.

28. A method of manufacturing a lithium air battery, the method comprising:
  disposing a composition for forming an ion conductive oxygen-blocking film on a substrate to form a coating, wherein the composition comprises a first polymer comprising a polyvinyl alcohol or a polyvinyl alcohol blend,
a lithium salt, and
an organic solvent;
drying the coating to form an ion conductive oxygen-blocking film, wherein the ion conductive oxygen-blocking film comprises a water ion conductive oxygen-blocking film comprising
 a first polymer comprising a polyvinyl alcohol or a polyvinyl alcohol blend, and
 a lithium salt,
 wherein the ion conductive oxygen-blocking film has an oxygen transmission rate of about 10 milliliters per square meter per day to about 10,000 milliliters per square meter per day; and
disposing the ion conductive oxygen-blocking film between a lithium negative electrode and a positive electrode to manufacture the lithium air battery.

29. The method of manufacturing the lithium air battery of claim 28, wherein the ion conductive oxygen-blocking film has a water content of about 300 parts per million or less.

30. The method of manufacturing the lithium air battery of claim 28, wherein the drying process comprises at least one selected from heat treating at about 20° C. to about 80° C., and heat treating at about 20° C. to about 80° C. in a vacuum atmosphere.

31. The method of manufacturing the lithium air battery of claim 27, wherein the composition for forming the ion conductive oxygen-blocking film further comprises at least one selected from an ionic liquid, an inorganic particle, a polymeric ionic liquid, and an oligomer.

32. The method of manufacturing the lithium air battery of claim 27, wherein the substrate is a lithium negative electrode.

* * * * *